（12）United States Patent
Stahl

(10) Patent No.: US 12,273,679 B2
(45) Date of Patent: *Apr. 8, 2025

(54) MULTI-MODAL AUDIO PROCESSING

(71) Applicant: SOUNDHOUND AI IP, LLC, Santa Clara, CA (US)

(72) Inventor: Karl Stahl, Palo Alto, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/642,492

(22) Filed: Apr. 22, 2024

(65) Prior Publication Data

US 2024/0276138 A1 Aug. 15, 2024

Related U.S. Application Data

(63) Continuation of application No. 18/194,885, filed on Apr. 3, 2023, now Pat. No. 11,997,448, which is a
(Continued)

(51) Int. Cl.
*H04R 25/00* (2006.01)
*G10L 15/22* (2006.01)
*G10L 21/0316* (2013.01)
*G10L 25/06* (2013.01)
*G10L 25/51* (2013.01)
*H04R 1/08* (2006.01)
*H04R 1/10* (2006.01)
*H04R 5/033* (2006.01)

(52) U.S. Cl.
CPC ........... *H04R 1/1083* (2013.01); *G10L 15/22* (2013.01); *G10L 21/0316* (2013.01); *G10L 25/06* (2013.01); *G10L 25/51* (2013.01); *H04R 1/08* (2013.01); *G10L 2015/223* (2013.01); *H04R 5/0335* (2013.01); *H04R 2420/07* (2013.01)

(58) Field of Classification Search
CPC ... H04R 1/1083; G10L 15/22; G10L 21/0316; G10L 25/06; G10L 25/51
See application file for complete search history.

(56) References Cited

U.S. PATENT DOCUMENTS 10,325,591 B1 6/2019 Pogue et al.
10,650,840 B1 5/2020 Solbach
(Continued)

OTHER PUBLICATIONS

Crepaldi, Marco, et al. "An analog-mode impulse radio system for ultra-low power short-range audio streaming." IEEE Transactions on Circuits and Systems (2015) pp. 2886-2897 (Year: 2015).
(Continued)

*Primary Examiner* — Simon King
(74) *Attorney, Agent, or Firm* — Young's Patent Services; Bruce A Young

(57) ABSTRACT

A method for processing an audio signal involves receiving sound waves at a microphone, converting them into a first audio signal, and extracting a second audio signal from an electromagnetic signal received at a receiver. The first audio signal is correlated with the second audio signal to calculate a correlation value. If the correlation value exceeds a threshold, the first audio signal is processed using the second audio signal to reduce unwanted sound contributions, resulting in a processed audio signal. Further processing is then performed on the processed audio signal to determine a characteristic of the desired sound.

20 Claims, 10 Drawing Sheets

Related U.S. Application Data continuation of application No. 17/301,308, filed on Mar. 31, 2021, now Pat. No. 11,627,405.

(60) Provisional application No. 63/004,364, filed on Apr. 2, 2020.

(56) References Cited

U.S. PATENT DOCUMENTS

| | | | |
|---|---|---|---|
| 11,627,405 B2 | 4/2023 | Stahl | |
| 2002/0153778 A1 | 10/2002 | Oughton | |
| 2003/0118197 A1 | 6/2003 | Nagayasu et al. | |
| 2013/0058496 A1 | 3/2013 | Harris | |
| 2013/0077803 A1 | 3/2013 | Konno et al. | |
| 2014/0270194 A1* | 9/2014 | Des Jardins | G10L 19/018 381/56 |
| 2017/0034026 A1* | 2/2017 | Li | H04L 43/16 |
| 2018/0188351 A1 | 7/2018 | Jones et al. | |
| 2019/0387312 A1 | 12/2019 | Liu et al. | |
| 2019/0394567 A1* | 12/2019 | Moore | H04R 3/04 |
| 2019/0394603 A1* | 12/2019 | Moore | H04R 29/002 |
| 2021/0312920 A1 | 10/2021 | Stahl | |
| 2021/0375275 A1 | 12/2021 | Yoon et al. | |

OTHER PUBLICATIONS

Flores, Marcel. "Wi-FM: Resolving neighborhood wireless network affairs by listening to music." 2015 IEEE 23rd International Conference on Network Protocols (ICNP). (2015) pp. 43-53 (Year: 2015).

Jeong, Seokhyeon, et al. "Always-on 12-nW acoustic sensing and object recognition microsystem for unattended ground sensor nodes." IEEE Journal of Solid-State Circuits (2017) pp. 261-274 (Year: 2017).

* cited by examiner

MULTI-MODAL AUDIO PROCESSING

CROSS-REFERENCE TO RELATED APPLICATIONS

This application is a continuation under 35 U.S.C. § 120 of U.S. patent application Ser. No. 18/194,885, entitled MULTI-MODAL AUDIO PROCESSING FOR VOICE-CONTROLLED DEVICES, filed Apr. 23, 2023, which is itself a continuation under 35 U.S.C. § 120 of U.S. patent application Ser. No. 17/301,308, now U.S. Pat. No. 11,627,405, entitled Loudspeaker with Transmitter, filed Mar. 31, 2021, which claims benefit under 35 U.S.C. § 119 to provisional U.S. Patent Application 63/004,364, entitled MULTI-MODAL AUDIO PROCESSING FOR VOICE-CONTROLLED DEVICES, filed on Apr. 2, 2020. The contents of all of the afore-mentioned applications are incorporated by reference herein for any and all purposes.

TECHNICAL FIELD

The present technology is in the field of voice-controlled devices. Certain examples relate to methods and devices for processing audio signals received by a voice-controlled device prior to speech recognition and certain methods and devices for converting audio signals to soundwaves emitted from speaker devices.

BACKGROUND

Recent advances in computing have raised the possibility of realizing many long sought-after voice-control applications. For example, improvements in statistical models, including practical frameworks for effective neural network architectures, have greatly increased the accuracy and reliability of previous speech processing systems. This has been coupled with a rise in wide area computer networks, which offer a range of modular services that can be simply accessed using application programming interfaces. Voice is quickly becoming a viable option for providing a user interface.

As speech is a natural mode of human communication, voice control offers many benefits over traditional user interfaces, such as a keyboard and mouse, or, more recently, a capacitive touch screen. Controlling a device using speech enables users to multitask, such as safely operating a motor vehicle or heavy machinery, or cooking a meal. It also avoids the need to touch surfaces that might have illness-causing germs. Voice-controlled devices have thus become popular in the home, where they are often used to receive answers to questions, play music, and set reminders. Voice control is also an active research area in automotive systems design. Speech is thus finding its place beside keyboards, mice, and touch screens as a mode of controlling and inputting information to machines.

Despite these advances, users often report that current systems lack human-level responsiveness and intelligence. Translating pressure fluctuations in the air into parsed commands is incredibly difficult. Speech processing typically involves a complex processing pipeline, where errors at any stage can derail a successful machine interpretation. Many of these challenges are not immediately apparent to human beings, who are able to process speech using cortical and sub-cortical structures without conscious thought. Engineers working in the field, however, quickly become aware of the gap between human ability and state of the art machine processing.

Devices that include a speaker (i.e. an electroacoustic transducer) are nearly ubiquitous in most people's environment. A typical home may have dozens of such devices, many with stereo or other multi-channel output, such as televisions, radios, smart speakers, telephones, computers, and portable "boom-boxes" just to name a few. Each of these devices may obtain audio signals and use the audio signal to generate sound waves, often concurrently with other devices. This can create a level of background sound that may make understanding of human speech, by other humans or by a computer, more difficult, especially if the generator of the background sound is close to the microphone.

As mentioned above, one issue with implementing successful voice control is the inherent noisiness of the environment, such as the background sound generated by speakers of electronic devices. Many speech recognition applications require a relatively clean source of speech audio data to apply modern speech processing methods. Neural networks are known for their lack of robustness, especially when presented with patterns that were not present in their training data. This is compounded by the inherent unpredictability of the real world. This often leads to diverging error rates between controlled academic environments and actual home, industry, or vehicle environments.

Methods of noise cancellation and echo suppression have been used to attempt to address this issue. Noise-cancelling headsets, which may be used for voice-recognition applications may include one microphone positioned to receive speech from the wearer and another microphone to receive ambient noise. The signals from the two microphones may then be used to reduce the amount of ambient noise and enhance the speech in an audio signal sent from the headset. Traditional noise cancellation techniques used in headsets, however, may not be directly applicable to modern voice-controlled devices, such as voice assistants and voice interfaces using a far-field microphone or microphone array, to cope with inherently noisy and unpredictable environments.

Non-voice user interfaces typically provide lock screens to avoid erroneous input, e.g. to avoid the issue of occasionally typing a random key on a keyboard or clicking or tapping a random place on a screen. Comparative user interfaces are also designed to help users address these errors, as demonstrated by the backspace key on keyboards. Keyboards and touchscreens are also typically used in controlled environments with close user proximity. This is not necessarily true of voice-controlled devices. This problem is compounded by the fact that many environments are full of sounds, including speech unrelated to voice control commands. As voice-controlled devices become more capable, and are used in many more applications, the risk of serious error increases.

BRIEF DESCRIPTION OF THE DRAWINGS

The accompanying drawings, which are incorporated in and constitute part of the specification, illustrate various embodiments. Together with the general description, the drawings serve to explain various principles. In the drawings.

DETAILED DESCRIPTION

Figure 1A:
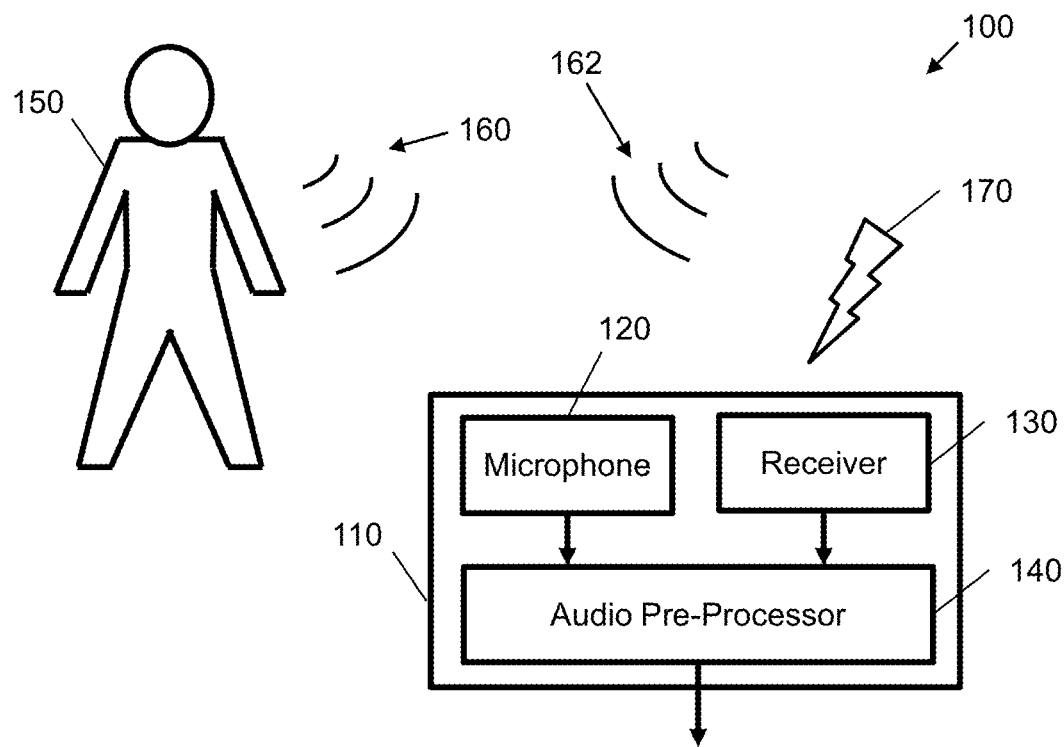
FIG. 1A is a schematic illustration showing an embodiment of a voice-controlled device.

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, and components have been described at a relatively high-level, without detail, in order to avoid unnecessarily obscuring aspects of the present concepts. A number of descriptive terms and phrases are used in describing the various embodiments of this disclosure. These descriptive terms and phrases are used to convey a generally agreed upon meaning to those skilled in the art unless a different definition is given in this specification.

Certain examples described herein relate to a voice-controlled device or a device actuated by some other type of sound. The voice-controlled device may be, amongst others, a voice assistant, a smartphone, a vehicle control system, a smart speaker, a computer running an application, or any other type of device that can be controlled using voice commands. The voice-controlled device uses a speech interface, e.g. a user uses their voice to interface with the device. In the present examples, the sound-actuated device is adapted to improve sound recognition by reducing noise, background sounds, and/or unwanted speech in an audio signal used for the sound recognition. Current sound-actuated devices may respond to sounds generated by speakers (or loudspeakers—the terms are used interchangeably herein) of a nearby electronic device, such as a television or radio. For example, an advertisement for the particular voice-controlled device may depict use of the device where the wake-word of the device and a command are used. The speaker of the television/radio may then send the sound from the advertisement to a nearby voice-controlled device of the same type being advertised, causing the voice-controlled device to respond, even though voice command came from the advertisement and not from the user.

The sound-actuated device receives sound waves through a microphone to create a first audio signal and receives an electromagnetic signal that provides a second audio signal that may be used to reduce the contribution of the second audio signal in the first audio signal to generate a processed audio signal that is used for speech recognition. Thus, the sound-actuated device is configured to receive audio signals via two different modes; hence, it may be said to perform multi-modal audio processing.

As mentioned above, the voice-controlled device is configured to receive a set of sound waves at a microphone of the voice-controlled device. The set of sound waves include speech uttered by a user and other sound. The other sound may include sound generated by another device, such as a speaker of another electronic device and may interfere with reception of the voice command by the voice-controlled device. The voice-controlled device then converts, using the microphone, the set of sound waves into a first audio signal that includes a contribution from the speech uttered by the user and a contribution from the other sound. A receiver of the voice-controlled device receives an electromagnetic signal and obtains a second audio signal from the electromagnetic signal. The electromagnetic signal may be generated by the same device that is generating some of the other sound, such as the speaker of the other electronic device, and thus, the second audio signal may be considered to be a "clean" audio signal that reflects a source of the other sound. The first audio signal is then processed using the second audio signal to reduce the contribution from the other sound in a processed audio signal. In some embodiments, this may be done by using a correlation function between the first audio signal and the second audio signal and a version of the second audio signal in the first audio signal may then be subtracted from the first audio signal to create the processed audio signal. Speech recognition is then performed on the processed audio signal to determine a voice command issued by the user.

In some embodiments, a device may be configured to recognize sounds other than speech, either in addition to speech recognition or instead of speech recognition. Examples of sounds that may be recognized include sounds made by smoke detectors, carbon monoxide detectors, intrusion alarms, breaking glass, gunshots, crying babies, barking dogs, or any other type of sound that may be associated with potential hazards or other events that may require a response. The sound-actuated device may operate in the same way as the voice-controlled device except that the targeted sound is the sound or sounds to be recognized instead of, or in addition to, speech uttered by the user, and sound recognition which can recognize the target sound instead of, or in addition to, speech may be performed. Although most of the examples presented herein specifically mention speech recognition, it should be understood that the examples could also be modified by one of ordinary skill to apply to recognition of sounds other than speech. Thus, examples directed to a voice-controlled device could be easily modified to apply to sound-actuated devices that recognize other types of sounds instead of, or in addition to, speech.

Certain examples described herein present ways to improve a sound interface. In particular, certain examples provide a way to manage extraneous sounds around speech-controlled machines that may lead to erroneous input and/or difficulties with speech recognition. Certain examples may be configured to help manage loudspeaker sources of interfering sound, which are often ubiquitous in human environments. These examples allow for sound-actuated devices to respond to natural human voices or sounds actually generated by the local environment (e.g. a window actually breaking) and reject audio that comes from loudspeakers. Loudspeaker audio is often particularly problematic as it contains natural-sounding human speech or other sounds to be recognized. As such, when trying to capture an audio signal to be used for recognition of speech or other sounds, the sound generated by nearby loudspeakers often creates interference that reduces the accuracy of the processing of the audio signal. For example, radio shows often include segments of human speech, as do television shows and movies. These segments of unwanted human speech may accidentally or intentionally issue inappropriate commands to voice-controlled devices and/or interfere with a user issuing a voice command. The present examples provide methods to address these issues.

Reference now is made in detail to the examples illustrated in the accompanying drawings and discussed below.

Voice-Controlled Devices

FIG. 1A shows a first example 100 of an embodiment of a voice-controlled device 110. The voice-controlled device 110 in this example includes a microphone 120, a receiver 130, and an audio pre-processor 140. The voice-controlled device 110 is arranged to receive voice commands from a user 150. In FIG. 1A, the user is located at a distance from the voice-controlled device 110, for example, the user 150 may be in the same room as the voice-controlled device 110 but the voice-controlled device 110 may not be arranged to directly receive audio from the user's mouth (e.g., the microphone 120 is not coupled to the user in the form of a headset with a microphone to pick up audio from the user's mouth). As such, the microphone 120 receives sound waves 160 from the user 150 and sound waves 162 from the environment of the user 150 and generates an audio signal. For example, if there are any other sources of sounds in the environment, such as electronically-originating sounds from loudspeakers, these will also be received as sound waves 162 and the total set of sound waves may interact with each other and the environment in complex ways. For example, in FIG. 1A, the user 150 may not be close enough to the microphone 120 such that the voice sound waves 160 are able to generate a resultant audio signal that is significantly greater in amplitude than the components in the same audio signal generated by other sound waves 162. This may mean that it is difficult to apply filtering approaches designed for close range (e.g. headset distance) microphones to the received voice signal.

An "audio signal," as the phrase is used herein and in the claims, refers to an electronic representation of sound waves. The audio signal may include one or more electrical signals and/or may include computer-readable information (e.g. binary data) that represent the sound waves. One example of an audio signal is an analog electrical signal that has frequency content correlated to the sound waves. Another example of an audio signal is a set of binary data representing periodic samples of the analog electrical signal (i.e. time-domain information). In yet another example, an audio signal may include binary data representing frequency-domain information derived from the sound waves. In some embodiments, the audio signal may be compressed and/or encoded using proprietary or industry-standard algorithms, such as, but not limited to MP3, or AAC. The audio signal may be sent as analog or digital electrical signals through one or more conductors, and/or digital information representing the audio signal may be stored in computer-readable memory devices. Thus an audio signal may have any known audio format.

The microphone 120 may include any transducer arranged to receive a set of sound waves and to convert those sound waves into an electronic representation of those sound waves (i.e. an audio signal). The microphone 120 may include any type of microphone and may include any number of separate transducers, such as those of a far-field microphone array. The microphone 120 may include a number of audio processing and filtering components that are not shown for clarity; as such, the first audio signal may represent a signal from the microphone 120 following initial processing, such as, but not limited to, band-pass filtering and/or analog-to-digital conversion. In the example of FIG. 1A, the microphone 120 outputs the first audio signal to the audio pre-processor 140.

In FIG. 1A, the receiver 130 is configured to receive an electromagnetic signal 170. The electromagnetic signal 170 is received in addition to the sound waves 160, 162. The electromagnetic signal 170 may be received via wired and/or wireless media and the receiver 130 may include a wireless receiver with an antenna configured to receive the electromagnetic signal 170 as a radio-frequency carrier modulated using a second audio signal and/or a connector configured to receive the electromagnetic signal 170 over one or more electrical conductors. In some embodiments the electromagnetic signal may be an optical signal received by an optical detector through the air or through a fiber-optic cable. FIG. 1A shows the electromagnetic signal 170 being received as a wireless communications signal. The receiver 130 is configured to output a second audio signal obtained from the electromagnetic signal 170. For example, the second audio signal may be obtained by demodulating the electromagnetic signal 170. The second audio signal may be output by the receiver 130 in a format that matches the format of the first audio signal output by the microphone 120; however, the audio signals may be of different formats and appropriately converted to allow for later processing as described below.

The first audio signal that is output by the microphone 120 and the second audio signal that is output by the receiver 130 are received by the audio pre-processor 140 in the example of FIG. 1A. The audio pre-processor 140 may include circuitry to process the first audio signal prior to passing the signal for speech recognition. Speech recognition may be performed locally and/or remotely, as indicated by the arrow in FIG. 1A and described later below. The audio pre-processor 140 may include one or more digital signal processors (DSP), one or more embedded processors (e.g. such as a Reduced Instruction Set Computer—RISC), and/or one or more central processing units (CPU). The audio pre-processor 140 may additionally, or alternatively, include one or more of a suitably programmed Field Programmable Gate Array (FPGA) and/or an Application Specific Integrated Circuit (ASIC). The form of the audio pre-processor 140 may depend on the particular form of the voice-controlled device 110, e.g. a smartphone may include a multi-core CPU, a voice assistant may include an embedded processor, and a dedicated low-cost device (e.g. to control an appliance) may include an FPGA or ASIC.

The audio pre-processor 140 is configured to process the first audio signal using the second audio signal to improve speech recognition on the first audio signal. The first audio signal is deemed to include a contribution from speech uttered by the user 150 as received with sound waves 160, however, it may also contain a contribution from sound waves 162 that are not this speech. The speech from the user 150 may carry voice commands. The terms "voice command", "speech" and "utterance" are used herein interchangeably to refer to a vocal sound produced by a user that represents linguistic information such as speech. For example, an utterance may include speech that emanates from a user's larynx. The speech may include a voice command, e.g. a spoken request from the user 150. The voice command may include, for example: a request to perform an action (e.g., "Play music", "Turn on heating", "Set a reminder"); further information relating to a request (e.g., "Album XY", "68 degrees Fahrenheit", "Tuesday at 9 am"); speech to be transcribed (e.g., "Take a note . . . " or "Send the following message to user A . . . "); and/or a request for information (e.g., "What is the traffic like on my commute?", "What is the weather like today?", or "Where is the best vegan taco?"). Although, the user 150 is shown as a human being, there may be cases where the user is a machine that issues speech (e.g., where artificial speech is used as a form of machine-to-machine communication).

The audio pre-processor 140 may be configured to reduce the contribution of the other sound in the first audio signal by using the second audio signal to generate a processed audio signal which is provided to a speech recognition subsystem. In some embodiments, the second audio signal may be removed from the first audio signal as at least part of a reducing the contribution of the other sound in the first audio signal. A statement that a signal is removed should not be interpreted to mean that every bit of that signal is removed, but that at least most of the second audio signal is removed as viewed from either the time domain or the frequency domain. In certain cases, the removal may be performed selectively, e.g. the second audio signal or a modified version of said signal is removed conditionally based on detection within the first audio signal. In other cases, such as where receipt of the electromagnetic signal 170 may be taken as indicative of presence of the second audio signal within the first audio signal, the second audio signal may be removed with no conditional logic. Reducing the contribution of the other sound may include subtracting a signal based on the second audio signal (e.g., a version of the second audio signal, where the second audio signal is output by the receiver 130) from the first audio signal. The subtracting may be performed on analog or digital signals and in either the time or frequency domain.

Following the processing of the first audio signal, the voice-controlled device 110 is configured to provide the processed audio signal generated by the audio pre-processor 140 to a speech recognition module to determine a voice command issued by the user. The speech recognition module may be integrated into the voice-controlled device 110 or may be a part of a remote computer system where the processed audio signal is sent over a computer network to the remote computer system. The speech recognition may be performed to determine a voice command issued by the user. Speech recognition may include applying a linguistic model such as one or more of an acoustic model and/or a language model. Speech recognition may be based upon known methods and is not the focus of the present examples.

In certain cases, the voice command may require no response. For example, a voice command to turn off a particular device may initiate a request to a device that is not the voice-controlled device 110 and no feedback to the voice-controlled device may be required. Or a voice command to send a notification to another user may also not require a response to be sent to the voice-controlled device 110. However, in other cases, a response issued by the voice-controlled device 110 following further speech processing may be required or desired. A response to the user 150 may be issued by the voice-controlled device 110 and may include audio and/or visual data for output. For example, the processing of the voice command may result in response data that includes audio instruction data. The audio instruction data may be processed at the voice-controlled device 110 and used to generate an audio output, e.g. via a text-to-speech module and one or more loudspeakers. If the voice-controlled device 110 includes a display screen, the response data may include data for the display of text and/or images on the display screen. Multi-modal outputs may be provided depending on the implementation.

Figure 1B:
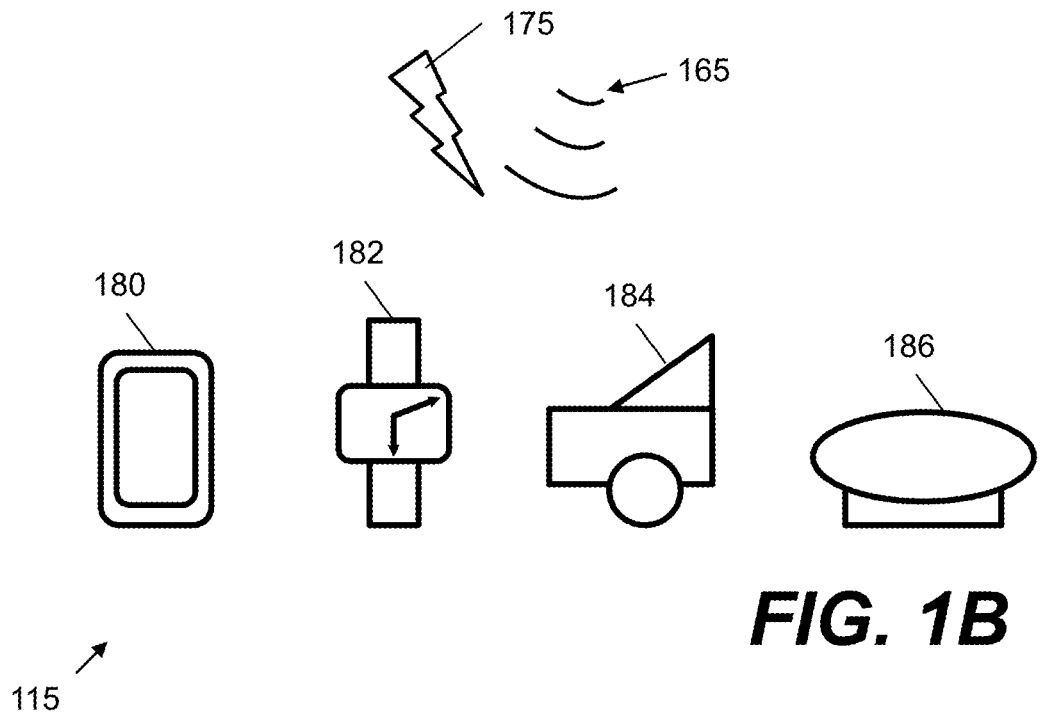
FIG. 1B is a schematic illustration showing alternative embodiments of voice-controlled devices.

FIG. 1B shows a non-limiting selection of a set of embodiments of voice-controlled devices 115. Each voice-controlled device receives sound waves 165 and electromagnetic signals 175 as described with reference to the voice-controlled device 110 of FIG. 1A and may have a similar structure and functionality as that device. The voice-controlled devices 115 may represent a range of computing devices including embedded computing devices, e.g. processing resources within electronic circuitry that are located within a non-computing device. Voice-controlled devices 115 may include client devices in a larger distributed computing system. In FIG. 1B, the example voice-controlled devices 115 are shown as, a personal computing device 180, a wearable device 182, a motor vehicle 184 and a home assistant (i.e. a smart speaker) 186. These examples are not to be taken as limiting. That is voice-controlled devices may alternatively be "smart" appliances such as refrigerators and televisions, security equipment, desktop and office computing devices, cameras, and robotic devices. The personal computing device 180 may be a cellular communications device and/or a wireless networking device. The personal computing device 180 may alternatively be a smartphone, tablet, or laptop device. The wearable device 182 in FIG. 1B is shown as a so-called "smart" watch but may alternatively be a device such as a wearable fitness tracker or "smart" clothing with embedded circuitry. The motor vehicle 184 is shown as a car (which is to say that a vehicle control system may include a voice-control functionality), but should not be taken to be limiting as other vehicle types and forms, such as aerial and nautical vehicles. Any type of a vehicle may be voice-controlled as described herein, including vehicles that may be manually controlled and/or have autonomous functions (e.g., aerial "drones"). The home assistant 186 may include an audio device for use, as non-limiting examples, in a home or automobile, and may also be referred to as a smart speaker.

In each of the cases above, a user may be located at a distance to the voice-controlled devices 115. That is to say that the user may not speak directly into the devices 115 at distances of a few centimeters, but at further distances from the device such as a foot or more or even across a room which may be several meters from a device 115. As such, the microphones of these voice-controlled devices 115 are likely to detect sound waves from interfering noise sources. These noise sources may include radios, music players, televisions, other computing devices, and the like. A noise source may be playing audio based on the second audio signal. As such, the electromagnetic signal 175 may include a radio or television signal that is demodulated to obtain the second audio signal may be the second audio signal may be used to drive loudspeakers of a local device. The local device may be a device that is not a voice-controlled device 115 (or in certain cases may include a voice-controlled device 115). In such cases, the second audio signal can be thought of as an original version of an interfering signal. A voice-controlled device 115 is thus able to obtain the second audio signal using the electromagnetic signal 175 in a similar manner to the local device that is playing the second audio signal. The audio pre-processor of a local device 115 may thus remove a version of the second audio signal to "clean" the first audio signal and leave audio content that is more representative of the voice command issued by a user.

In other embodiments, the second audio signal may be a signal that is used to drive a local speaker device, and the speaker device may be configured to transmit a low power wired or wireless signal for detection by a voice-controlled device 115. In effect, the speaker device may be configured to output two forms of signal: a first form of the audio signal that is transmitted using sound waves 165 (e.g., that is output by a transducer in a conventional manner) and a second form of the audio signal that is transmitted using and electromagnetic signal 175. Hence, the speaker device transmits, and a voice-controlled device 115 receives, a multimodal form of the second audio signal: one version of the second audio signal is received via sound waves 165 and is present within the first audio signal with other sounds and another version of the second audio signal is received electronically via the electromagnetic signal 175.

The second audio signal may represent a noise signal that is captured locally and then transmitted via the electromagnetic signal 175. For example, an audio transducer and transmitter may be located on, in, or near a sound generating device, like a refrigerator, coffee machine, printer, washing machine, engines, motors, and other rotating or vibrating machinery. The audio transducer may convert the sound 165 made by the sound generating device into the second audio signal and the transmitter may then generate the electromagnetic signal 175 using the second audio signal and transmit the electromagnetic signal 175 to the voice-controlled device 115. In some embodiments, the electromagnetic signal 175 may be a low power (e.g., local) radio transmission that is receivable by the voice-controlled device 115. The voice-controlled device 115 thus has access to a clean (e.g., unmixed) noise signal that may be removed from the first audio signal. In certain cases, the sound recording device may conditionally transmit the electromagnetic signal 175, e.g. when a locally measured noise level has an intensity greater than a predetermined threshold. As such, presence of the electromagnetic signal 175 may indicate that a noise source is present, and the second audio signal may be unconditionally subtracted from the first audio signal. This approach may also be applied across multiple noise generating devices, e.g. each emitting an electromagnetic signal and as such a voice-controlled device 115 may be configured to remove multiple second audio signals corresponding to multiple, different, interfering noise sources. This approach may be implemented using low cost, low power components and may form part of a standard method for reducing noise interference within the home and office.

Distributed and Local Speech Processing

Figure 2A:
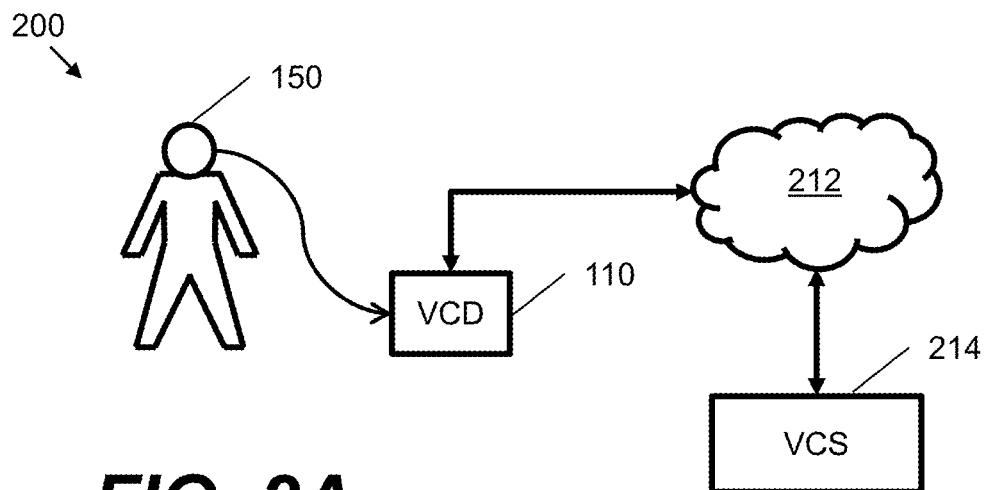
FIG. 2A is a schematic illustration showing an embodiment of a voice-controlled device communicating with a voice control server.
Figure 2B:
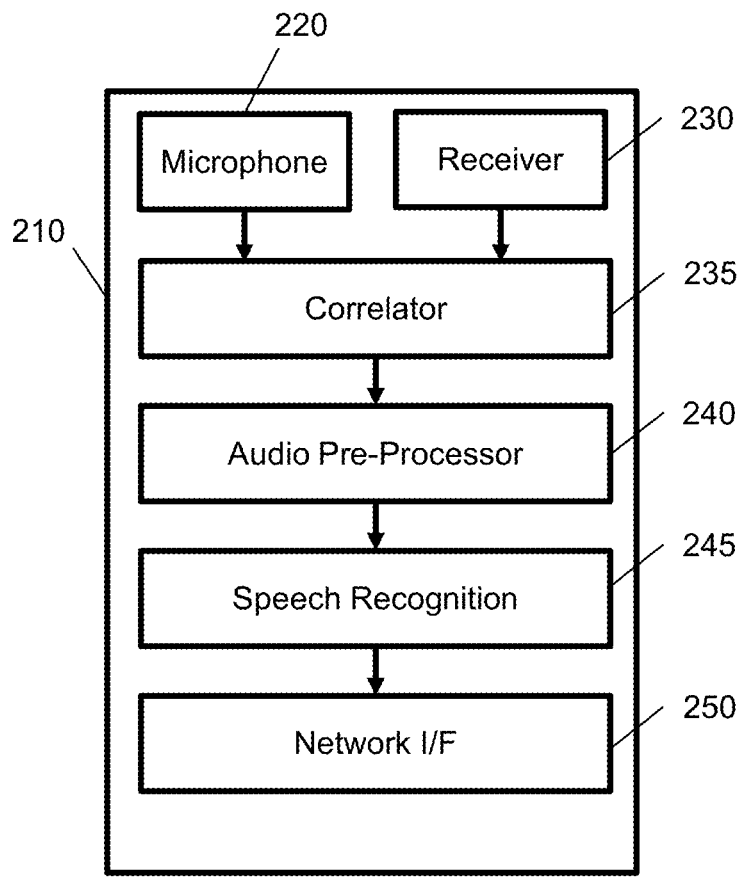
FIG. 2B is a block diagram of an embodiment of a voice-controlled device.

FIGS. 2A and 2B show examples of ways in which speech processing may be performed in association with the voice-controlled devices 110, 115 of FIGS. 1A and 1B.

FIG. 2A shows an embodiment of a client-server architecture 200 for voice control according to an example. The client-server architecture 200 includes one or more voice-controlled devices (VCD) 110 as client devices that communicate over at least one network 212 with a voice control server 214. The network 212 may include one or more local and/or wide area networks that may be implemented using a variety of physical technologies such as wired technologies such as Ethernet and/or wireless technologies such as Institute of Electrical and Electronics Engineers (IEEE) 802.11 standards (i.e. Wi-Fi) and cellular communications technologies. In certain cases, the network 212 may include a mixture of one or more private and/or public networks such as the Internet. The voice-controlled device 110 and the voice control server 214 may communicate over the network using different technologies and communication pathways.

The voice control server 214 may include a computing device with one or more central processing units and/or graphical processing units and a memory resource. The computing device may further include a communications interface and implementations of one or more communications protocols (e.g., in a multi-layer communications stack). The voice control server 214 is configured to receive data from the voice-controlled devices 110 over the network 212. In at least one embodiment, the voice control server 214 may include a wired or wireless physical interface and one or more communications protocols that enable receiving requests in a predefined format. In at least one case, the voice control server 214 may include an application layer interface operating on top of an Internet Protocol suite. In this case, the application layer interface may be configured to receive communications directed towards a particular Internet Protocol address identifying the voice control server 214, with routing based on path names or web addresses being performed by one or more proxies and/or communication (e.g., "web") servers.

The voice control server 214 is configured to receive data from one or more voice-controlled devices 110 that relates to a voice command issued by a user 150. In in such embodiments, the voice control server 214 may receive an output of the audio pre-processor 140 of the voice-controlled device 110 (as shown in FIG. 1A) and perform speech recognition and/or processing of the voice command remotely. Thus, the voice control server 214 may include a speech recognition module. The voice control server 214 may send response data back to the voice-controlled device 110, depending on the embodiment. In certain cases, at least a portion of one or more of an acoustic model and/or a language model may be hosted on the voice control server 214 and used to process data derived from the audio pre-processor 140. Various different distributed processing methods may be applied, where the level of processing performed on each of the voice-controlled devices 110 and the voice control server 214 may depend on the implementation. In other embodiments, the voice-controlled devices 110 may perform all processing locally, e.g. at the device or within a local area network, and so not communicate with a remote server device.

FIG. 2B shows more detail of an embodiment of a voice-controlled device 210, which may be seen as a variation of the voice-controlled device 110 of FIG. 1A. The embodiment shown in FIG. 2B should not be considered limiting; the features shown may be omitted and/or combined in different combinations depending on the embodiment.

As per the voice-controlled device 110 of FIG. 1A, the voice-controlled device 210 includes a microphone 220, a receiver 230 and an audio pre-processor 240. Where not otherwise described, these components may be taken to have similar properties and functions to their counterparts described with reference to FIG. 1A. In the embodiment of FIG. 2B, the voice-controlled device 210 further includes a correlator 235, a speech recognition component 245 and a network interface 250. The correlator 235 is arranged to respectively receive the first and second audio signals from the microphone 220 and the receiver 230. As described above, the first audio signal is derived from sound waves received by the microphone 220 and the second audio signal is derived from an electromagnetic signal received by the receiver 230. Although the receiver 230 and network interface 250 are shown as separate components in FIG. 2B, in certain implementations they may include shared circuitry and/or components (e.g., antennas and decoding circuitry). The speech recognition component (or module) 245 receives an output of the audio pre-processor 240, which may include a processed audio signal having a reduced contribution of the second audio signal as compared to the first audio signal. The speech recognition component 245 may perform at least a portion of local speech processing upon the processed audio signal (e.g., may implement processing indicated by the arrow to "Speech Recognition" in FIG. 1A). The speech recognition component 245 is shown communicatively coupled to the network interface 250. The network interface 250 may include a wired and/or wireless interface to communicate with further devices over a network. For example, the network interface 250 may allow communication over the network 212 in FIG. 2A, including communication with the voice control server (VCS) 214. The speech recognition component 245 may communicate with the voice control server 214 via the network interface 250 and the network 212 to perform distributed speech processing and/or to implement voice control.

In the embodiment of FIG. 2B, the correlator 235 is configured to correlate the first audio signal with the second audio signal and to generate a set of correlation parameters. The audio pre-processor 240 is then configured to reduce the contribution from the other sound in the processed audio signal by using the correlation parameters with the second audio signal. The set of correlation parameters may include parameters indicative of a time delay between a version of the second audio signal present in the first audio signal and the second audio signal as received via the electromagnetic signal. For example, the version of the second audio signal that is present in the first audio signal may be delayed due to propagation via sound waves and/or processing of the second audio signal to generate the sound waves. As electromagnetic signals travel at approximately the speed of light, and the speed of light is much faster than the speed of sound, the electromagnetic signal will generally be received before the sound waves, if both are generated from a common base audio signal. Hence, the version of the second audio signal that is propagated via sound waves and is present in the first audio signal will generally be delayed when compared to a time base of the second audio signal as transmitted via the electromagnetic signal. The set of correlation parameters may further (or alternatively) include a scaling factor or amplitude. This may indicate a scaling of the amplitudes of the second audio signal as found within the first audio signal. For example, a version of the second audio signal that is transmitted via sound waves may be present as a lower amplitude background signal. This may also be the case if an interfering noise source, such as a loudspeaker, is located at a distance to the microphone 220.

Depending on how the first and second audio signals are interpreted, the correlator may apply a cross-correlation or auto-correlation function. For example, if the first and second audio signals are considered separate signals, the correlation function may be implemented as a cross-correlation function; if the first and second audio signals are considered different versions of a common signal, the correlation function may be implemented as an auto-correlation function. In both cases, a common set of mathematical operations may be applied. Either function may output one or more of a time difference and/or an amplitude for a version of the second audio signal that is deemed to be present within the first audio signal. The time difference and/or the amplitude may then be used by the audio pre-processor 240 to remove a version of the second audio signal from the first audio signal by subtracting a modified version of the second audio signal from the first audio signal. The time difference may be determined as a time delay or lag, and may be continuous (e.g., a number of milliseconds) or discrete (e.g., a number of time steps of a periodic clock or reference signal). The amplitude may be determined using a scaling factor as a multiplier of the amplitude of the second audio signal to arrive at an amplitude level present in the first audio signal. One or more of the time difference and/or amplitude may be derived from a convolution of at least a portion of the second audio signal and the first audio signal, e.g. a segment of the second audio signal may be convolved with the first audio signal and an alignment may be indicated by a magnitude of the convolved output. The alignment may indicate the time difference (e.g., by retrieving a time step where the magnitude is maximized) and then a delayed version of the second audio signal may be compared with the first audio signal to determine the scaling factors. Different approaches may be applied depending on the implementation.

Thus, the processing may include determining a time difference between a version of the second audio signal that is present within the first audio signal and the second audio signal that is obtained from the electromagnetic signal. The second audio signal obtained from the electromagnetic signal using the determined time difference may be delayed to generate a modified version of the second audio signal which may be subtracted from the first audio signal. Alternatively, or in addition, the processing may include determining an amplitude of a version of the second audio signal that is present within the first audio signal. The second audio signal obtained from the electromagnetic signal may then be scaled based on the determined amplitude to generate a modified version of the second audio signal which may be subtracted from the first audio signal.

Cross-Correlation

Figure 3:
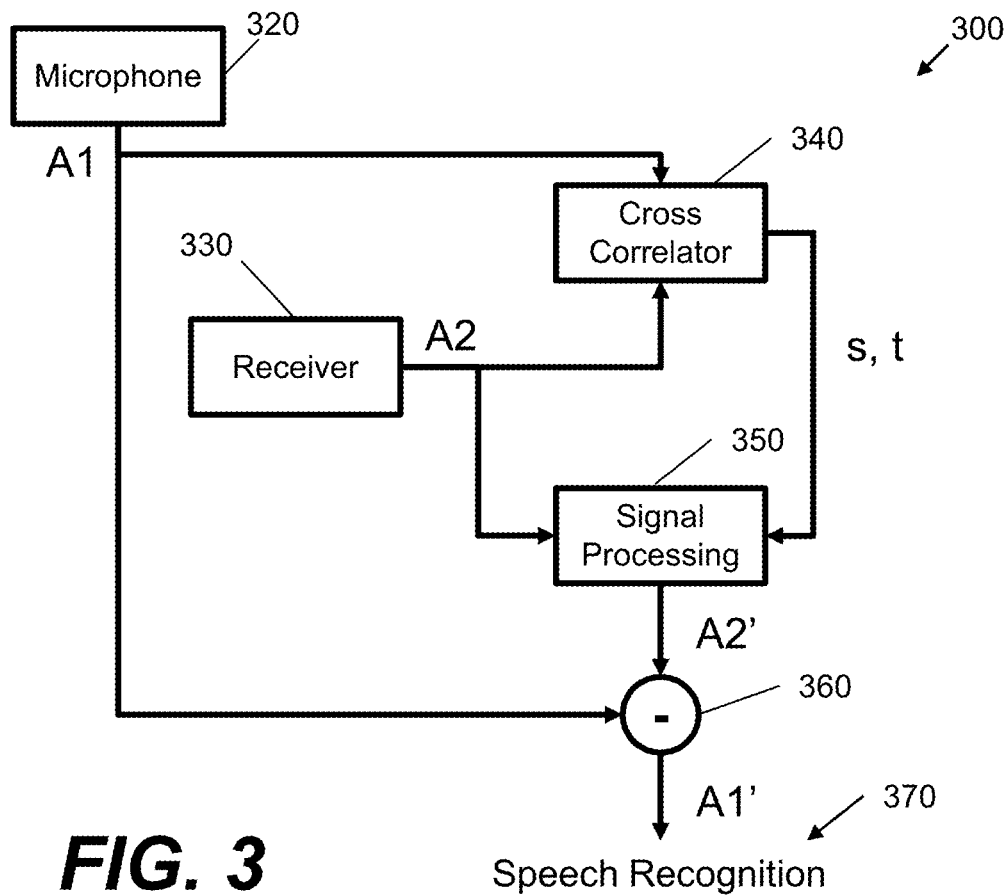
FIG. 3 is a schematic illustration showing an embodiment of a signal processing configuration.

FIG. 3 shows an example embodiment 300 of how cross-correlation may be performed to obtain parameters for use in processing the first audio signal. FIG. 3 shows a microphone 320 and a receiver 330, which may include components similar to the microphones and receivers of other example embodiments. The microphone 320 outputs a first audio signal A1 and the receiver 330 outputs a second audio signal A2. FIG. 3 also shows a cross-correlator 340, which receives the first signal A1 and second audio signal A2. The cross correlator 340 applies a cross-correlation function (which as explained above may also be an auto correlation function) and outputs an amplitude scaling factor s and a time lag t. These variables may be the amplitude and time difference parameters discussed above. The variables s and t are received by a signal processing component 350. The signal processing component 350 also receives the second audio signal A2 from the receiver 330. The signal processing component 350 is configured to modify the second audio signal A2 using the variables s and t to output a modified second audio signal A2'. For example, the signal processing component 350 may scale the second audio signal obtained from the electromagnetic signal using the determined amplitude scaling factor s and delay the same signal using the determined time lag t. The modified second audio signal A2' thus includes a version of the second audio signal A2 that is transformed to match the version of the second audio signal A2 that is present within the first audio signal A1. Given this, at subtraction component 360, the modified second audio signal A2' is subtracted from the first audio signal A1 to output a modified version of the first audio signal A1', e.g. A1'=A1-A2', which may be referred to as a processed audio signal. The modified version of the first audio signal A1' is then sent for speech recognition as indicated at 370. This may include sending the processed audio signal to a voice recognition module.

Thus, the processing may include evaluating a cross-correlation function between the first audio signal and the second audio signal and obtaining a time delay and/or a scaling factor from an output of the cross-correlation function. The time delay and/or the scaling factor may be applied to the second audio signal to obtain a modified version of the second audio signal which then may be subtracted from the first audio signal. Further, a voice-controlled device may include a cross-correlator that receives the first audio signal and the second audio signal and applies a cross correlation function to provide an output to the audio preprocessor. The audio pre-processor may be configured to determine a time delay and/or a scaling factor based on the output of the cross-correlator, and to use the time delay and/or the scaling factor with the second audio signal to reduce the contribution from the other sound in the processed audio signal. In some embodiments, the cross-correlation may be performed on a portion of the second audio signal, such as a small segment, to derive the correlation parameters, and this cross-correlation may need only be performed once or intermittently, with the correlation parameters used for a longer period of time after they have been calculated.

The subtraction of A2' from A1 may be performed as a subtraction of the values of samples in the time domain. This requires quite precise calculation of time lag t. In some examples, it is preferable to convert signals A1 and A2 to the frequency domain or convert the A1 and A2' inputs provided to the subtraction component into the frequency domain before performing the subtraction. Such conversion may be done using known techniques such as performing a Fourier transform on frames of audio samples. Though operating at the time resolution of frames is less precise, many approaches to speech recognition operate on frames of audio. Therefore, subtracting a frequency domain representation of A2' from A1 in a frame of audio may be appropriate for speech recognition 370. In certain cases, subsequent speech processing may be performed with frequency domain signals; in other cases, frequency domain signals may be converted back to the time domain. It should be noted that in the examples described herein "audio signals", such as first or second audio signals, include audio signals in non-time domains, such as signals that have been mapped to the frequency domain, Mel-frequency cepstral coefficients, and/or filter bank outputs. These signals may change with time, e.g. the aforementioned frame may include a representation in a non-time domain that is associated with a particular point in time. The removal of the second audio signal (including the selective removal of a processed version of the second audio signal) may be performed in a non-time domain such as one of the aforementioned domains. In certain cases, computations in the frequency domain may be performed on the magnitude portions of a complex-valued signal or may be performed on the complex values themselves.

Multiple Second Audio Signals

Figure 4:
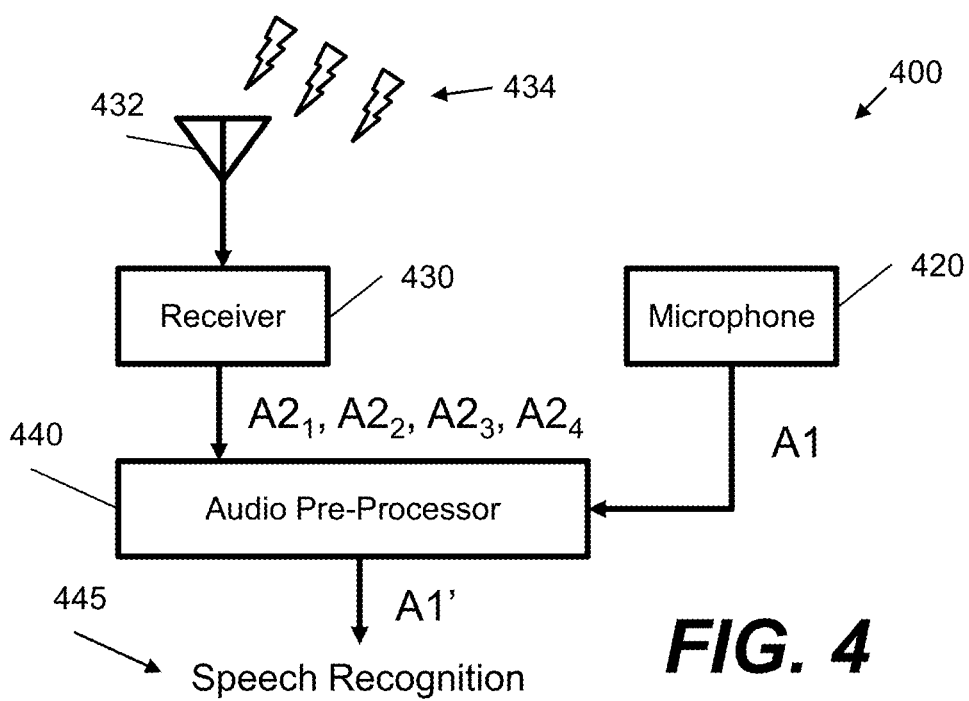
FIG. 4 is a schematic illustration showing an embodiment of a receipt of multiple audio signals from a set of electromagnetic signals.

In certain embodiments, such as the multi-modal processing system 400 shown in FIG. 4, a receiver of a voice-controlled device is configured to receive one or more electromagnetic signals to obtain a plurality of other audio signals, including the second audio signal. In such embodiments the audio pre-processor may be configured to use at least one of the plurality of other audio signals, in addition to the second audio signal, to reduce the contribution from the other sound in the processed audio signal.

The multi-modal processing system 400 includes a microphone 420, a receiver 430, and an audio pre-processor 440 similar to previous examples. The multi-modal processing system 400 may form part of, or be communicatively coupled to, a voice-controlled device. As per previous examples, the audio pre-processor 440 receives audio signals from the microphone 420 and the receiver 430. In the multi-modal processing system 400, the audio pre-processor 440 receives a first audio signal A1 from the microphone 420.

The receiver 430 is communicatively coupled to an antenna 432 (which may include a plurality of antennae in certain examples). The antenna 432 receives one or more electromagnetic signals 434. In at least one embodiment, the antenna 432 may receive a plurality of electromagnetic signals 434, such as different amplitude modulation (AM) or frequency modulation (FM) signals carrying different transmissions. In certain cases, the antenna 432 may receive one or more time or frequency multiplexed signals, such as Orthogonal Frequency-Division Multiplexing (OFDM) signals. The electromagnetic signals 434 may include terrestrial signals, satellite signals and/or cable signals The electromagnetic signals 434 may include Digital Audio Broadcasting (DAB) signals, Digital Video Broadcasting (DVB) signals. HD Radio signals, and/or Advanced Television Standards Committee (ATSC) signals, from one or more radio stations and/or television broadcasts. Different antenna may receive different forms of signal (e.g., one antenna may receive AM signals in one frequency range and another antenna may receive OFDM signals in a different frequency range). Any form of analog or digital modulation and/or encoding may be used to carry a set of second audio signals $A2_i$. The receiver 430 may be configured to demodulate and/or decode one or more of the set of second audio signals $A2_i$. In at least one embodiment, a set of received second audio signals $A2_i$ may not include all audio signals that are receivable via the electromagnetic signals 434 but may include a subset of the decodable audio signals. In embodiments, configuration data may be provided to indicate a set of audio signals to extract from the one or more electromagnetic signals 434 (e.g., similar to a list of frequencies for a radio and/or television station scan). The set of audio signals to extract may change over time, and may, in some cases, be based on broadcasts that are regularly listened to or audio signals that have been previously matched by a correlation process.

In FIG. 4, the set of second audio signals $A2_i$ includes a plurality of second audio signals. While four second audio signals, $A2_1$, $A2_2$, $A2_3$, and $A2_4$, are shown in FIG. 4, any number of second audio signals may be extracted and or used, depending on the embodiment and the received electromagnetic signals 434. The set of second audio signals $A2_i$ are passed from the receiver 430 to the audio pre-processor 440. The audio pre-processor 440 is configured to determine whether one or more of the set of second audio signals $A2_i$ are present in the first audio signal A1 received from the microphone 420. This may include iterating a process similar to that shown in FIG. 3 or described in other examples. For example, each of the set of second audio signals $A2_i$ may be correlated with the first audio signal (e.g. in series and/or parallel) to determine if one or more of the set of second audio signals $A2_i$ are present. In some embodiments, presence of one of the set of second audio signals $A2_i$ may be indicated by an amplitude scaling factor that is greater than a predefined threshold. Thus, after or in parallel with the processing of the second audio signal as described above, a third audio signal may be obtained from the one or more electromagnetic signals and correlated with the first audio signal to calculate a correlation value. In response to the correlation value being larger than a threshold, the contribution from the other sound in the first audio signal may be reduced by using the third audio signal to generate the processed audio signal.

A time difference may also be compared to a set of constraints (e.g., limited to delays and/or within a predefined range representing likely delay ranges). In at least one embodiment, it may be assumed that just one of the set of second audio signals $A2_i$ is present; thus, a second audio signal with a largest amplitude scaling factor that is greater than a predefined threshold may be selected as a present signal. In other cases, multiple second audio signals may be used, for example, representing a radio playing in one room and a television playing in another room. The second audio signals of the set of second audio signals $A2_i$ that are deemed present may be removed by the audio pre-processor 440 to provide the processed audio signal A1' for speech recognition 445. Each of the detected second audio signals may have associated correlation parameters that are used to individually scale, delay, and remove the signals (e.g., as shown in FIG. 3).

Examples such as the multi-modal processing system 400 may improve speech data used for speech processing based on the assumption that much background audio output by loudspeakers is extracted from radio signals either by demodulation of an analog audio radio transmission or by decoding of digitally encoded audio, such as an audio stream associated with a video transmission from a source such as a satellite. In some example embodiments, radio signals are received in the vicinity of a microphone and are used to extract an audio signal in the form of the described second audio signals. An audio signal representing audio data captured by a microphone may then be searched or scanned (e.g., using a convolution that implements a correlation function) to search for the audio signal extracted from the radio signals in the audio captured by the microphone. If the audio signal extracted from the radio signals is found, its amplitude and delay may be estimated and an amplitude-scaled time-aligned copy of the extracted audio signal may be subtracted from the audio signal captured by the microphone (i.e., from the first audio signal). In the multi-modal processing system 400, audio signals $A2_i$ may be extracted from one or more electromagnetic signals 434 (such as radio, television, satellite media broadcasts, etc.) in the vicinity of a voice-controlled device. For example, the receiver 430 may be configured to scan through a set of bands and channels, decode and output any audio streams, and then pass these audio streams to the audio pre-processor 440 to compute a correlation function (such as by applying one or more convolutional filters on the received audio signal) to identify the delay and magnitude of the version of the second audio signals that are detected in the first audio signal. The second audio signals may correspond to the same audio signals that are received and extracted by nearby loudspeaker devices such as radios and televisions.

In some embodiments, when a present second audio signal is detected within the first audio signal (e.g., where the correlation is applied using a small segment of the second audio signal), the receiver 430 may lock onto the electromagnetic signal that carries the detected second audio signal, such that the full audio stream from the electromagnetic signal may be extracted, delayed, and scaled before being removed on a continuous basis from the audio A1 captured by the microphone 420. If the second audio signal includes an encrypted signal, such as digitally encrypted digital rights management (DRM) controlled signal, then the receiver 430 may be equipped with decryption components and decryption keys to decrypt the content. In some embodiments, the receiver 430 may only be licensed to decrypt a particular version of the second audio signal, e.g. a version that is good enough for signal cancellation but limited or not suitable for direct listening.

Thus, the receiver of a voice-controlled device may be configured to receive one or more electromagnetic signals to obtain a plurality of other audio signals, including the second audio signal, and the audio pre-processor of the voice-controlled device may be configured to use at least one of the plurality of other audio signals, in addition to the second audio signal, to reduce the contribution from the other sound in the processed audio signal. Further, a method of processing an audio signal for a voice-controlled device may include obtaining a plurality of other audio signals (including the second audio signal) from the one or more electromagnetic signals, detecting one or more of the plurality of other audio signals within the first audio signal, and subtracting versions of the detected one or more of the plurality of other audio signals from the first audio signal.

Speaker Devices

Figure 5A:
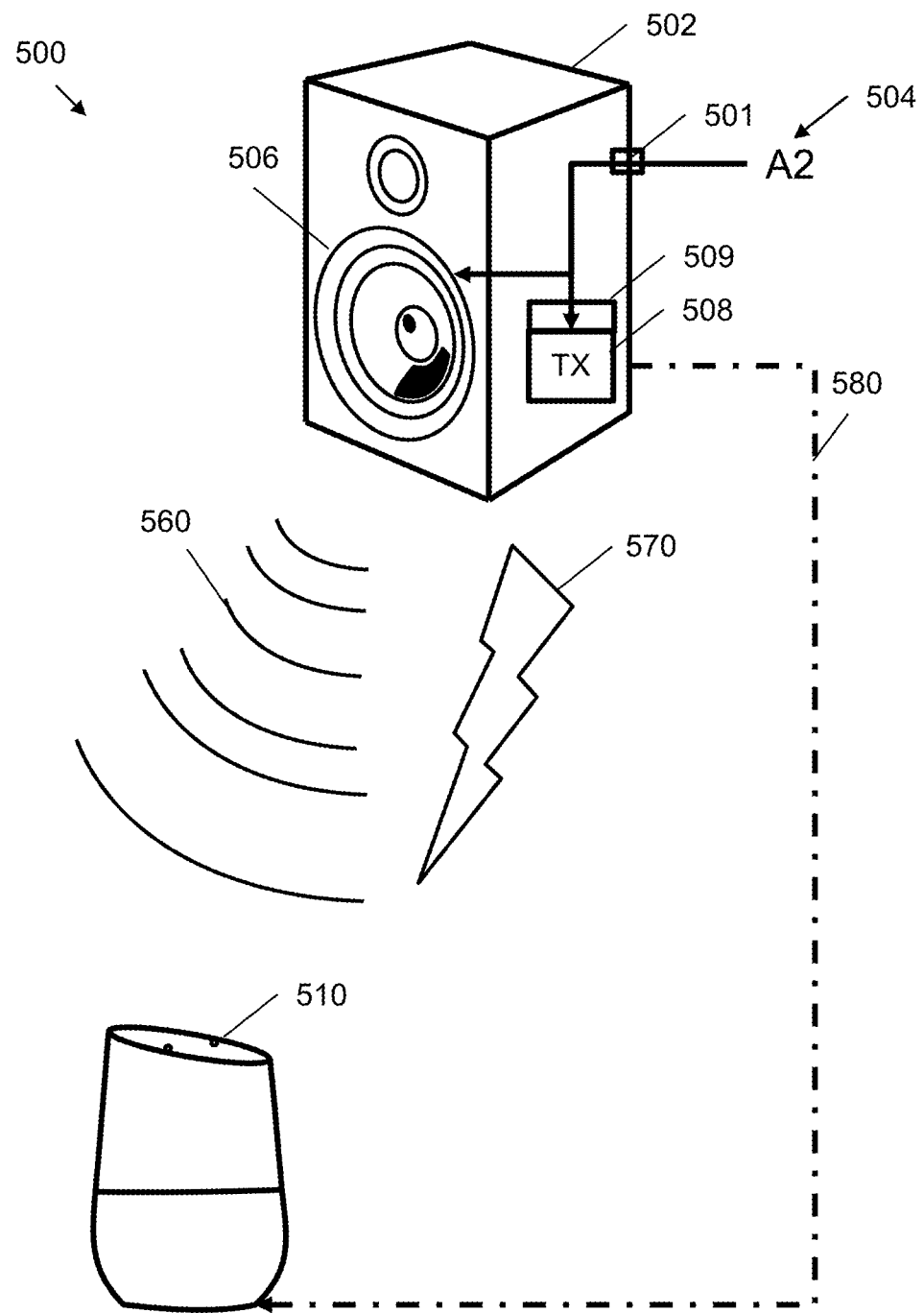
FIG. 5A is a schematic illustration showing an embodiment of a system that includes a speaker device and a voice-controlled device.
Figure 5B:
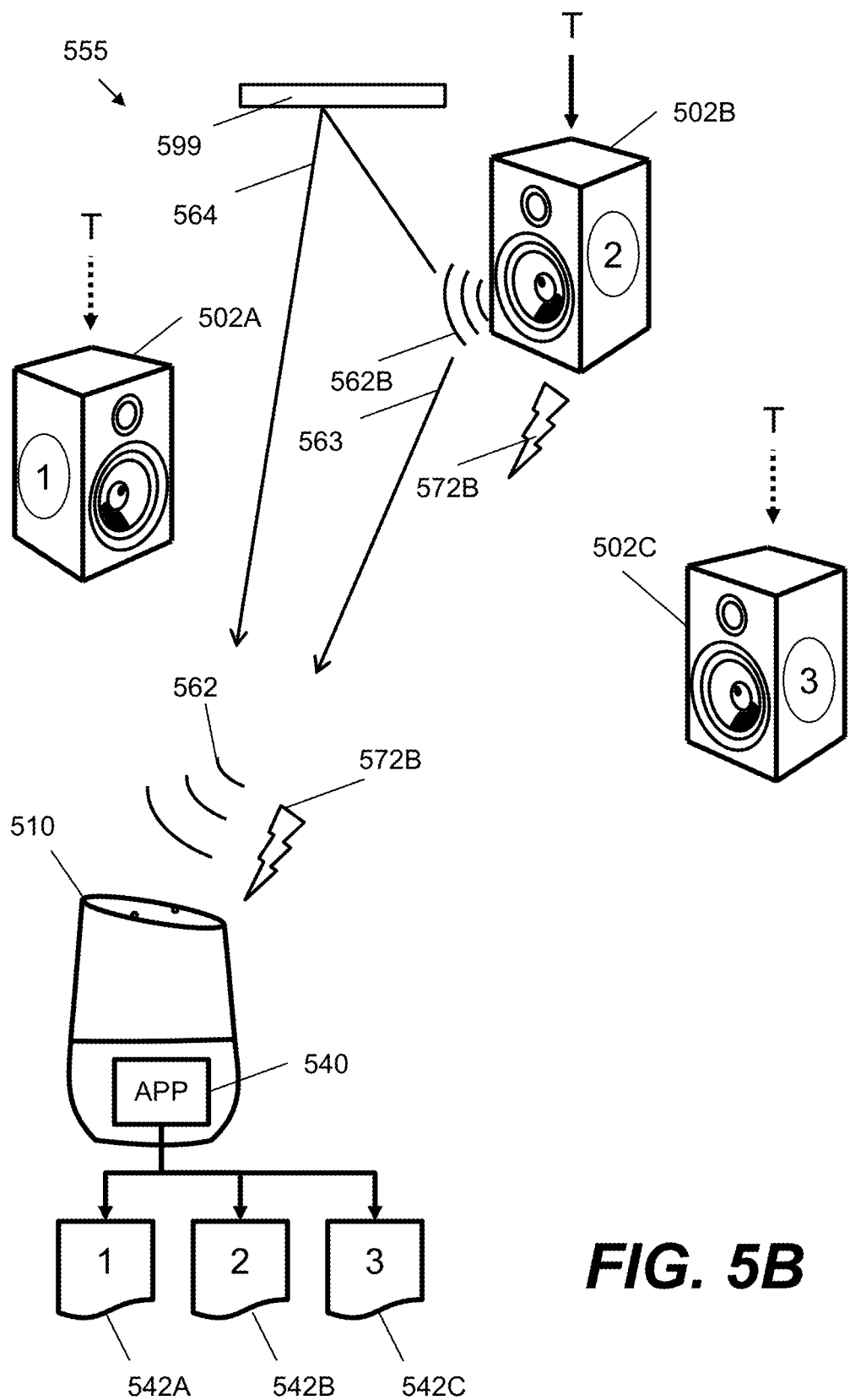
FIGS. 5B and 5C are schematic illustrations showing the embodiment of FIG. 5A applied to a multiple speaker device configuration.
Figure 5C:
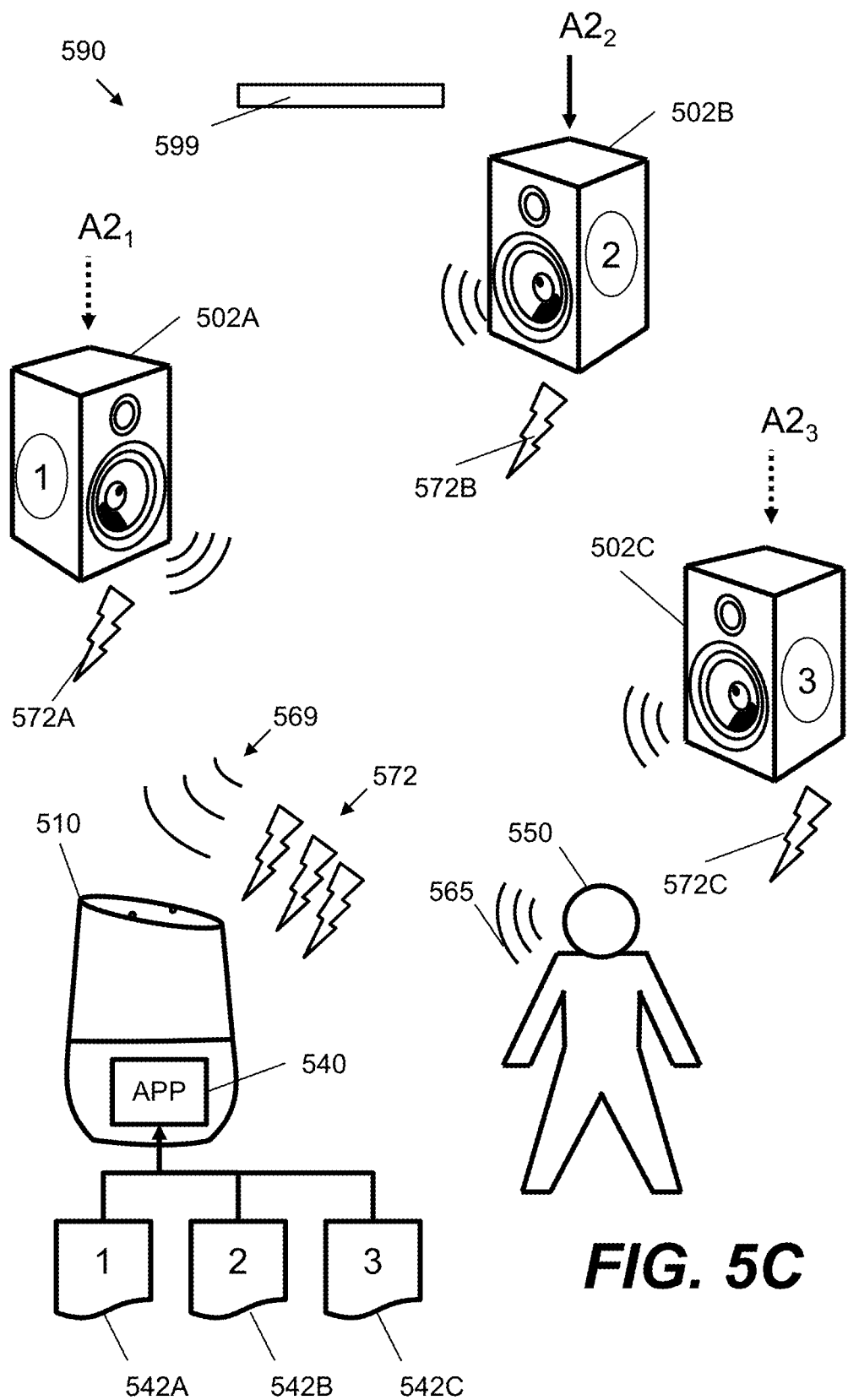

FIGS. 5A to 5C show examples of a potential source of the electromagnetic signals described in the previous examples. The embodiments shown in FIGS. 5A to 5C may be used in combination with the examples that receive ambient electromagnetic signals (e.g., the radio and television examples described above) and/or may be implemented separately. In certain cases, common receiver components may be used for both sets of examples.

FIG. 5A shows a system 500 that includes an embodiment of a speaker device 502 used in combination with an embodiment of a voice-controlled device 510. The voice-controlled device 510 may be implemented according to one of the previous examples, e.g. voice-controlled device 110 or 210. The voice-controlled device 510 may include components as shown in one or more of FIGS. 2B, 3 and 4. The speaker device 502 is adapted to generate electromagnetic signals for receipt by the voice-controlled device 510, as described above.

The speaker device 502 receives an audio signal (A2) 504. The speaker device 502 includes an electroacoustic transducer 506 (e.g. a speaker) and a transmitter 508. The electroacoustic transducer 506 and the transmitter 508 both receive the audio signal 504. The electroacoustic transducer 506 is configured to convert the audio signal 504 into a set of sound waves 560. The transmitter 508 is configured to transmit an electromagnetic signal 570 that carries the audio signal 504. The transmitter 508 of the speaker device 502 may be configured to transmit the electromagnetic signal 570 for receipt at distances limited to an audibility range of the set of sound waves 560. The speaker device 502 may obtain the audio signal 504, convert the audio signal 504 into a set of sound waves 560 emitted by the speaker device 502 using an electroacoustic transducer 506, generate an electromagnetic signal 570 that carries the audio signal 504, and transmit the electromagnetic signal 570 for receipt by a voice-controlled device 510 that is also within audio range of the set of sound waves 560.

The speaker device 502 may obtain the audio signal 504 by any known method. The speaker device 502 may be a stand-alone loudspeaker that receives the audio signal 504 as an electronic waveform in the time domain through a connector 501 or as a wireless signal, such as through a Bluetooth® personal area network. The speaker device 502, in other embodiments, may be a television or radio device that receives a modulated radio-frequency (RF) signal and demodulates the RF signal to obtain the audio signal 504. The speaker device 502 may access a storage media, such as a cassette tape, a compact disc, or a computer-readable memory device, to obtain the audio signal 504. Depending on the embodiment, the speaker device 502 may obtain the audio signal 504 from any known source and may include any combination of any number of speakers, displays, user interfaces, power sources, or other devices, in addition to the electroacoustic transducer 506 and the transmitter 508.

The transmission of both the sound waves 560 and the electromagnetic signal 570 to the voice-controlled device 510 is illustrated in FIG. 5A. The sound waves 560 generated by the electroacoustic transducer 506 are transmitted by pressure waves in the air to the voice-controlled device 510. The sound waves 560 travel through air at the speed of sound, approximately 340 meters/second (m/s), and therefore may take several milliseconds (ms) to travel the distance between the speaker device 502 and the voice-controlled device 510 in a typical system where the speaker 502 is within audible range of the voice-controlled device 510. If the speaker 502 and the voice-controlled device 510 are in the same room, they may typically be 1 to 5 meters (m) away from each other, corresponding to an acoustic delay of between about 3 ms and 15 ms. If the speaker 502 is in a different room of a house than the voice-controlled device 510, they may be up to about 20 m apart corresponding to a delay of about 60 ms. It is likely that if the speaker 502 and voice-controlled device 510 are more than about 20 m apart, the sound waves 560 are not in audible range of voice-controlled device 510, at least in home settings, due to typical room sizes and home layouts. In other environments, a range of 100 m may be considered an audibility range for the speaker device 502 although other embodiments may consider the audibility rage to be any other distance.

An audible range (or audibility range) for the speaker device 502 may be determined statically or dynamically, depending on the embodiment. In some embodiments, the audibility range of the speaker device 502 may be predetermined to be a set distance, based on an expected usage of the speaker device, that corresponds to a distance at which the set of sound waves is estimated to be below a predetermined sound level. For example, a small speaker in a notebook computer with a 1 watt (W) amplifier may be targeted for use within about 1 m of a user and may be assumed to be essentially inaudible at distances over about 3 m, which may be considered a fixed audibility range for that device. As another example, a television set may include speakers which are designed for use within a medium-sized room in a home and may be considered inaudible at distances over about 10 m which may be considered a fixed audibility range for the television set.

In other embodiments the audibility range may be dynamically determined based on a volume level set for the speaker device 502 and/or the audio content of the audio signal 504 being received. The speaker device 502 may use preprogrammed algorithms to determine a distance at which the current sound waves 560 are likely to be at a sound level below a predetermined sound level based on a current amplitude of the audio signal 504 and/or a gain level (e.g. volume level) set for the speaker device. Any sound level may be used for the predetermined sound level, depending on the embodiment, but some embodiments may use a level that is low enough to not interfere with speech recognition of a voice at normal speaking levels when received by a microphone about 3 m from the user that is speaking. In some embodiments, a noise level of between about 20 A-weighted decibels (dBA) and 40 dBA may be used as the threshold although other embodiments may use a threshold that is higher or lower. A dynamically calculated audibility range may be calculated using parameters determined by testing during the development stage of the speaker device 502 in typical room environment and may be a rough estimate of the actual distance where the current sound waves 560 reach the predetermined threshold.

Similarly, the electromagnetic signal 570, which may be a wireless electromagnetic signal such as a low-power radio transmission, is transmitted through the air from the transmitter 508 to the voice-controlled speaker 510. If the speaker device 502 and the voice-controlled device 510 are in the same room or are separated by distances of less than the audibility range of the sound waves 560, (e.g. about 20 m, or less than 100 m), transmission and receipt of the electromagnetic signal 570 may be thought of as being instantaneous, at least compared to the delay of the sound waves 560, at under 70 nanoseconds (ns) for 20 m. In other examples, the electromagnetic signal may alternatively be communicated by a wired medium, e.g. as indicate by dashed line 580, but which may also be considered to be instantaneous as compared to the delay of the sound waves 560. Hence, the voice-controlled device 510 may receive the second audio stream 504 through the electromagnetic signal 570 before it receives the sounds waves 560 generated using that second audio stream 504 by the speaker device 502.

In certain variations, existing components of conventional speaker devices may be adapted to implement the components of embodiments of the speaker device 502. For example, the transmitter 508 may be powered using the audio signal 504. The speaker device 502 may include a connector 501 configured to receive the audio signal 504 through one or more conductors coupled to the connector 501. The speaker device 502 may also include circuitry 509, coupled to the connector 501 and the transmitter 508, configured to extract electrical power from the audio signal 504 for use by the transmitter 508. The circuitry 509 may include energy storage and harvesting components such as a capacitor and a rectifier or charge pump. In some embodiments, the transmitter 508 may receive power from an electrical energy storage component such as a relatively large capacitor. The capacitor may be charged by a rectifier that is powered by an alternating current signal that drives the loudspeaker 506 and provides the audio signal 504. This may avoid the need for a battery or wall-plug power source. In other embodiments, however, the transmitter 508 and/or the complete speaker device 502 may be powered by a wall plug, battery, solar panel, or other power source. The transmitter 508 may also use all or a segment of the electroacoustic transducer 506 as an antenna, e.g. a loudspeaker coil wire may be used as an antenna.

In certain examples, for example to maintain privacy and low power consumption or to limit the reception of the electromagnetic signal 570 to voice-controlled devices 510 that are within the audibility range of the speaker device 501, the transmitter 508 may be configured to transmit the electromagnetic signal 570 at a power level that results in a predefined attenuated signal level of the electromagnetic signal 570 at the audibility range of the set of sound waves 560. The determination of the audibility range was discussed in some detail above, but it can be a static distance or a dynamically calculated distance, depending on the embodiment. The predefined attenuated signal level of the electromagnetic signal 570 may be based on a minimum signal level for reception of the electromagnetic signal 570 by a voice-controlled device 510 configured to receive the electromagnetic signal 570. A voice-controlled device 510 may specify a minimum signal level for an electromagnetic signal 570 to be received and various speaker devices 510 may utilize this information to determine the appropriate power level for transmitting the electromagnetic signal. Such speaker devices 510 may advertise support for specific models or brands of voice-controlled devices and some may have settings or configurations that can be adjusted to allow customization for a specific model or brand or a voice-controlled device.

Various types of devices that include loudspeakers may be adapted to include low-power radio transmitters that transmit a radio signal corresponding to the audio output by the loudspeaker. As an example, a radio or a television device may act as a speaker device consistent with this disclosure. Thus, a speaker device may include a receiver configured to receive a radio-frequency signal and a demodulator configured to demodulate the radio-frequency signal to extract the audio signal. Such devices may also be fitted with a transmitter to provide the audio signal on an electromagnetic signal. Radio power levels from the transmitter may be configured so that the electromagnetic signal is only receivable within a distance similar to a distance that sound waves propagate. The transmitted audio signal provided via the electromagnetic signal 570 may be a lower quality signal than is typically used to provide high-fidelity sound and still be useful for reducing the contribution of that audio signal in the processed audio signal used for voice recognition by the voice-controlled device 510. This may allow a relatively simple implementation that is less complex that typical technologies used to transmit an audio signal and that may be implemented using low-cost off-the-shelf components with low power and processing requirements. For example, a radio frequency and digital encoding rate may be set at a minimum level to cover audio streams for subtraction. This may use different configurations to those used for high-quality audio for human listening. For example, a coarser quantization may be applied, together with more aggressive clipping—this would still allow effective interfering source removal yet would make it practical for implementation in power-sensitive devices.

Analog or digital audio streams may be modulated on a radio-frequency carrier to generate the electromagnetic signal 570, and any modulation technique may be applied, including but not limited to simple techniques such as analog amplitude modulation, or digital amplitude shift keying. In other embodiments, the transmitter 508 may transmit an analog signal modulated with the audio signal 504 using any known method, including, but not limited to, frequency modulation (FM), phase modulation (PM), or the aforementioned amplitude modulation (AM) of a radio-frequency (RF) carrier. The transmitter 508 may also be coupled to, or include, a digital signal encoder from which the transmitter 508 receives a digitally encoded signal. The transmitter 508 may modulate the RF carrier with the digitally encoded signal using any known method, including, but not limited to, frequency shift keying (FSK), phase shift keying (PSK), quadrature amplitude modulation (QAM), orthogonal frequency division multiplexing (OFDM), or the aforementioned amplitude shift keying (ASK) of the RF carrier. The digital signal encoder may in turn be coupled to a digital signal processor (DSP) and encode a digital signal from the DSP. The DSP may operate on the audio signal 504, as received by the speaker device 502. Such a digital encoder and DSP may form simple processing circuitry (e.g. an FPGA or ASIC) that is included as part of the transmitter 508 shown in FIG. 5A. The speaker device 502 may also receive a digital audio signal as the audio signal 504 which it may convert to an analog audio signal for use by the electroacoustic transducer 506 and/or the transmitter 508. For example, the audio signal 504 may be received as a High-Definition Multimedia Interface (HDMI) and/or digital optical signal. In a wired example, wired coupling 580 may include digital audio signals from a surround sound system or the like that is connected to the voice-controlled device 510.

In some embodiments, the speaker device 502 may include a power amplifier that drives the electroacoustic transducer 506. Depending on the design of the power amplifier, it may accept either an analog or a digital signal as its input. The power amplifier may include a volume setting controllable by a user either through a user input element on the speaker device 502 or using a remote control of the speaker device 502 communicating through an infrared or RF interface. The volume level set may be used in some embodiments for dynamically determining an audibility range for the speaker device 502.

Although the speaker device 502 is shown in FIG. 5A as a loudspeaker, it may alternatively form part of another device, such as a smartphone, a tablet, a wearable device, or a wireless radio. Such devices may be battery-powered devices and as such power consumption may be a significant constraint. In these cases, power consumption may be reduced by the transmitter 508 receiving power directly from the battery, e.g. rather than through a rectified audio signal from a power amplifier. As described above, low power-consuming DSP processing, digital encoding, and modulation may be implemented. In a further variation, since only audible signal frequencies are required for removal for later speech processing and transmissions need travel no farther than the audio signal through the air, modulation may be applied at a relatively low frequency (e.g., as compared to comparative radio frequencies for short range communications). According to the Nyquist-Shannon information encoding theory, a sampling or modulation frequency of twice the highest audible frequency to transmit is sufficient to carry the information, thus, the electromagnetic signal may include a carrier radio signal that is modulated using the audio signal at a modulation frequency that is at least twice a highest audio frequency within the audio signal. For high-fidelity audio, the highest frequency is typically around 20 kHz, allowing a minimum sampling/modulation frequency of 40 kHz. Lower sampling/modulation frequencies may be applied to band limited audio signals which may be effective for speech recognition. For example, traditional telephony services limited bandwidth in a voice channel to 4 kHz, allowing a sampling frequency of 8 kHz, which may be suitable for embodiments herein.

In certain cases, a carrier frequency that allows for passage of the electromagnetic signal 570 through doors and other internal openings but provides for attenuation by window frames may be used. A frequency of around 200 MHz has a wavelength of slightly under 2 meters, which may allow for passing through most human doorways while being attenuated by many window frames. It is also fast enough for modulation of audio signals, such as those with a bandwidth between 4 kHz and 20 kHz. Hence, the radio-frequency carrier signal may have a frequency of less than 300 MHz. In certain cases, the carrier radio signal may have a frequency less than 2 GHz to allow use of bands other than used bands within the 2-5 GHz range. In other cases, existing radio transmission technologies such as IEEE standard 802.15.1 (Bluetooth) may be used that utilize an RF carrier in the 2.4 GHz range and have attenuation properties that are similar to sound within a personal area range. Existing radio transmission technologies may take advantage of the wide availability of low-cost commodity components for implementations. Some embodiments may utilize RF bands that do not require a license from a regulatory body (e.g. the Federal Communications Commission), such as those reserved regionally or internationally for industrial, scientific, and medical purposes and may be known as industrial, scientific, and medical (ISM) bands. Examples of ISM bands include, but may not be limited to, 13.553-13.567 MHZ, 26.957-27.283 MHz, 40.66-40.7 MHz, and 433.05-434.79 MHz, as well as the 2.4-2.5 GHz and 5.725-5.875 GHz ISM bands which may be used by Bluetooth, Zigbee®, and Wi-Fi radios.

Multiple Speaker Devices

FIGS. 5B and 5C show an example where multiple speaker devices may be used. FIG. 5B shows a setup phase in which the characteristics of multiple speaker devices may be profiled. FIG. 5C shows a use phase in which the measured characteristics may be used to enhance an audio signal containing a voice command that is issued by a user.

In the setup phase 555 shown in FIG. 5B, a plurality of speaker devices are shown. Any number of speaker devices may be included in various embodiments, but in the example shown there are three speaker devices, a first speaker device 502A, a second speaker device 502B and a third speaker device 502C. In some cases, the speaker devices 502A, 502B, 502C may form part of a multi-channel audio system, such as a surround sound system. In other cases, the speaker devices 502A, 502B, 502C may form part of a multi-room audio system (e.g., the speaker devices may be distributed around a home, office building, or public space). In yet other embodiments, the speaker devices 502A, 502B, 502C may be independent of each other. Each of the speaker devices 502A, 502B, 502C may be configured as per the speaker device 502 of FIG. 5A.

FIG. 5B also shows a voice-controlled device 510, which again may be the voice-controlled device 510 shown in FIG. 5A. The voice-controlled device 510 may be configured as per any of the previously described voice-controlled devices. In FIG. 5B, an audio pre-processor (APP) 540 is shown, which may be similar to the audio pre-processor of other examples. Other components of the voice-controlled device 510 are omitted for clarity.

In the setup phase 555 shown in FIG. 5B, the voice-controlled device 510 is configured to receive electromagnetic signals from the plurality of speaker devices 502A, 502B, 502C. These electromagnetic signals may be received in parallel or received in a sequence with each speaker device is profiled in turn. The electromagnetic signals are generated as described with reference to the example 500 of FIG. 5A based on a test signal T that is received by the speaker devices 502A, 502B, 502C. In FIG. 5B, each speaker device 502A, 502B, 502C is shown receiving the same test signal T, but that need not be the case in all implementations (e.g., the speaker devices 502A, 502B, 502C may receive different signals in some embodiments). Although the signal is described as a test signal T which may be configured with predetermined audio characteristics, in other embodiments it may not be a specially configured signal and may instead be any audio signal that is played by the speaker devices 502A, 502B, 502C.

Turning to the specific example of FIG. 5B, in this case, each speaker device 502A, 502B, 502C in turn receives the test signal as the input audio signal 504 shown in FIG. 5A. In FIG. 5B, the second speaker device 502B is shown generating electromagnetic signal 572B and acoustic (i.e. sound waves) signal 562B. The pair of signals 562B, 572B may be generated as described with reference to the example of FIG. 5A. In FIG. 5B, the sound waves 562B generated by the second speaker device 502B are received as at least a part of the sound waves 562 and electromagnetic signal 572B is also received by the voice-controlled device 510. The pair of signals 562B, 572B may be received as per previous examples, e.g. by a receiver and microphone, respectively. In FIG. 5B, the audio pre-processor 540 applies processing similar to that described for the other examples to determine characteristic 542B, such as, but not limited to, a time delay or a scaling factor, which may be stored by the voice-controlled device 510 for later use.

The setup phase 555 shown in FIG. 5B may then repeat the process for the other speaker devices 502A, 502C and generate characteristic 542A for speaker device 502A and characteristic 542C for speaker device 502C based on the sound waves and electromagnetic signals sent from those devices. These characteristics 542A, 542B, 542C may include, for example, the time delay and amplitude scaling factor described with respect to the example 300 of FIG. 3 and/or acoustic transfer functions that indicate how sound waves propagate between the location of each speaker device 502A, 502B, 502C and the voice-controlled device 510. Note that during the setup phase, some embodiments may determine the characteristics 542A, 542B, 542C serially for each speaker device 502A, 502B, 502C, but during normal operation each speaker device 502A, 502B, 502C will transmit electromagnetic signals concurrently, so some systems may perform the setup of the speaker devices 502A, 502B, 502C concurrently.

To allow multiple electromagnetic signals to be simultaneously received by the voice-controlled device 510, each speaker device 502A, 502B, 502C may be assigned a different RF carrier frequency or a networking protocol may be used to allow the speaker devices 502A, 502B, 502C to time-multiplex a single carrier frequency and identify its electromagnetic signal to the voice-controlled device 510. Any type of networking protocol may be used, including, but not limited, to, a token-passing protocol, a collision detection protocol, or a time-slot based protocol, and the protocol may be based on a standard from IEEE, ITU, or other standards body, or may be a proprietary protocol. The voice-controlled device 510 may include identifying information for an electromagnetic signal, such as a carrier frequency or an identifier (e.g. an internet protocol address, a media access controller address, an international mobile equipment identity, or other unique identifier) used in a networking protocol, with the stored characteristics 542A, 542B, 542C to allow a received electromagnetic signal 572B to be properly associated with a stored characteristic 542B.

The characteristics 542A, 542B, 542C may also include more advanced parameters such as reflection models and the like, to allow multiple versions (e.g. echoes and reverberations) of at an audio signals (e.g. $A2_2$ or the second audio signal) from a single speaker device (e.g. 502B) to be removed from the signal sent for speech recognition. For example, the sound waves 562 received by the voice-controlled device 510 may include a first version of the sound waves 562B from the second speaker device 502B that is from a direct transmission path 563 from the second speaker device 502B to the voice-controlled device 510 and a second version of the sound waves 562B from the second speaker device 502B that is from a reflected transmission path 564 from the second speaker device 502B reflected off a wall 599 to the voice-controlled device 510 Thus, the voice-controlled device 510 may determine that both a first version of the second audio signal (e.g. a contribution from a direct path transmission 563 of sound waves 562B) and a second version of the second audio signal (e.g. a contribution from a reflected version 564 of sound waves 562B) of the second audio signal $A2_2$ are present within the first audio signal generated by the microphone of the voice-controlled device 510 from the sound waves 562. The first version of the second audio signal and the second version of the second audio signal each have at least one of a different amplitude than, a delay from, or a frequency shift from, the second audio signal $A2_2$ and from each other. The voice-controlled device 510 may subtract both the first version of the second audio signal and the second version of the second audio signal from the first audio signal as at least a part of the processing to generate the processed audio signal for speech recognition.

FIG. 5C shows a use phase 590 that uses the speaker devices 502A, 502B, 502C and voice-controlled device 510 of FIG. 5B. The use phase 590 may follow the setup phase 555. In the use phase 590, each speaker device 502A, 502B, 502C is driven by a different version of a second audio signal. For example, the first speaker device 502A is driven by the second audio signal $A2_1$, the second speaker device 502B is driven by the second audio signal $A2_2$, and the third speaker device 502C is driven by the second audio signal $A2_3$. The plurality of second audio signals $A2_i$ may include a common (i.e. shared) audio signal that is output by all the speaker devices (e.g., as found with a multi-room audio system), may include different versions of an audio stream (e.g., different channels of a 5.1 or 7.1 surround sound system), and/or may include different audio streams entirely (e.g., different radio stations playing at the same time).

In FIG. 5C, a user 550 attempts to issue a voice command to the voice-controlled device 540 while at least some of the speaker devices 502A, 502B, 502C output sound waves based on the respective versions of the second audio signal $A2_i$. The voice-controlled device 510 thus receives sound waves that are a complex mixture of the sound waves 569 output by the speaker devices 502A, 502B, 502C and speech 565 from the user 550. However, in this case, as per the example of FIG. 5A, the voice-controlled device 510 also receives electromagnetic signals 572A, 572B, 572C (collectively electromagnetic signals 572) from each of the speaker devices 502A, 502B, 502C, respectively. In the example, the audio pre-processor 540 is configured to use the determined characteristics 542A, 542B, 542C to remove at least one second audio signal originating from the plurality of speaker devices from the first audio signal.

Thus the voice-controlled device 510 may receive, at the receiver, a plurality of electromagnetic signals 572 from a plurality of speaker devices 502A, 502B, 502C, and output a plurality of other audio signals $A2_1$, $A2_2$, $A2_3$ obtained from the plurality of electromagnetic signals 572 and receive, at the microphone, sound waves 569 from the plurality of speaker devices 502A, 502B, 502C as at least a part of the other sound that is received with the speech 565 from the user 550. The audio pre-processor 540 is configured to use at least one of the plurality of other audio signals $A2_1$, $A2_2$, $A2_3$ to reduce the contribution from the other sound in the processed audio signal that is used for speech recognition. The audio pre-processor 540 may retrieve determined characteristics 542A, 542B, 542C based on identifying information of the received plurality of electromagnetic signals 572 and use the retrieved characteristics 542A, 542B, 542C with the other audio signals $A2_1$, $A2_2$, $A2_3$ obtained from the plurality of electromagnetic signals to reduce their contribution in the processed audio signal used for speech recognition.

So as an example, the voice-controlled device 510 may determine and store characteristics 542A, 542B, 542C for all three speaker devices 502A, 502B, 502C during a setup phase 555. During operation, the first speaker device 502A may be turned off and not generating sound waves or an electromagnetic signal while the other two speaker devices 502B, 502C are operating and sending out sound waves representing other audio signals $A2_2$, $A2_3$ and electromagnetic signals 572B, 572C carrying their respective audio signal. The voice controlled device 510 receives the electromagnetic signals 572B, 572C from the two operating speaker devices 502B, 502C, determines identifying information for the two received electromagnetic signals 572B, 572C (e.g. carrier frequency or an identifier from a network protocol), and uses that information to determine that the second characteristic 542B and the third characteristic 542C should be retrieved and used respectively with the second other audio signal $A2_2$ and the third other audio signal $A2_3$ to reduce the contribution of those two audio signals in the processed audio signal used for speech recognition. This may be done by applying a time delay and or a scaling factor stored in the characteristics 542B, 542C to their respective audio signal $A2_2$, $A2_3$ and then subtracting the modified versions of the audio signals $A2_2$, $A2_3$ from the audio signal generated by the microphone from the sound waves 569, 565. Thus, the voice-controlled device 510 may determine identifying information for the received electromagnetic signal 572B and retrieve one or more previously stored characteristics 542B based on the identifying information. The voice-controlled device 510 may then use the retrieved characteristics 542B with the second audio signal $A2_2$ as at least a part of the processing to generate the processed audio signal which is used for speech recognition.

As is shown, the plurality of second audio signals $A2_1$, $A2_2$, $A2_3$ may be removed in a manner similar to that of system 400 of FIG. 4, however, in this case the setup phase 555 of FIG. 5B allows the more resource-intensive correlation operations to be skipped during normal operation as the characteristics 542A, 542B, 542C are pre-computed during the setup phase 555.

In certain examples, the setup phase 555 may be repeated periodically. For example, it may be repeated at the request of a user, e.g. during configuration of a surround sound system and/or the voice-controlled device 510. It may also be performed if the voice-controlled device 510 and/or one or more of the speaker devices 502A, 502B, 502C change location, and/or when a speaker device 502A, 502B, 502C is added or removed from the plurality of speaker devices.

The example of FIGS. 5B and 5C may be seen as one embodiment where the voice-controlled device is configured to determine signal characteristics for a plurality of copies of the second audio signal that are present within the first audio signal and where the audio pre-processor is configured to process the first audio signal based on the signal characteristics to generate the processed audio signal. Other embodiments are described later below.

In certain examples, approaches similar to those shown in FIGS. 5A and 5B may be used to provide a "fingerprint" of an environment for a voice-controlled device. One advantage of sending an electromagnetic signal, which travels at the speed of light, with content that is also transmitted as a set of sound waves, which travel at the speed of sound, is that the difference in the way audio and electromagnetic signals behave physically allows different properties of the environment to be determined. For example, electromagnetic signals and acoustic signals (i.e. sound waves) may experience difference reflections (e.g., echoes) and attenuations. The different signals may react differently to different entities within the environments, such as walls, doors, windows, furniture, flooring, surface decoration etc. For example, at least a time lag and an amplitude difference for one or more of the sound waves and the electromagnetic signals may indicate properties of the environment, such as a distance from speaker devices to the microphone of the voice-controlled device. An extended setup phase, similar to that shown in FIG. 5B, may be used to build a map of the location of transmitters and receivers in a space. The additional use of the electromagnetic signals allows artifacts such as sound wave interference due to reflected signals, which is a frequent problem for beam forming microphone systems, to be corrected.

As described with respect to FIG. 5B, examples set out herein may provide a setup training routine for an area with physically fixed loudspeakers (such as a 7.1 channel sounds system in a home) and a microphone at a fixed location, such as a smart speaker. For each loudspeaker, test signals in the form of an audio impulse and radio impulse may be generated. At the microphone of the voice-controlled device, a time delay and a relative intensity change may be detected for each reflection of the sound wave arriving at the microphone. The per-reflection parameters may be stored for each loudspeaker (e.g., as characteristics 542A, 542B, 542C in FIGS. 5B and 5C). Hence, in a use phase, when outputting audio, a copy of the audio signal from each loudspeaker channel may be received via radio transmissions. These copies may be delayed and scaled for each known reflection based on the stored data, before being removed from the audio signal received by the microphone.

In certain cases, profiling may be applied using analog radio signals and analog audio signals. Whereas digital radio protocols are usually designed to remove multipath or refractive artifacts and extract just a digital signal, analog radio and audio signals may allow for differences in diffraction to be measured (such as a bending of transmitted signals around corners). Characteristics determined from the profiling may then be used to provide a model of a room, such as the shape of walls and objects. By using both radio and acoustic signals synergistic effects may be seen; for example, glass is transmissive of radio waves but reflective of sound waves, and so glass windows or screens may be located by looking for sound wave reflections that are not found with radio waves.

In other examples, a computed correlation function between audio signals obtained from an electromagnetic signal and a set of sound waves may be used to determine a delay of two or more receptions of the signals that followed different length paths. This can give an accurate distance measurement between a speaker device and microphone. This approach may be used to track motion if the voice-controlled device is moving. For example, the voice-controlled device may include a smartphone such as 180 in FIG. 1B or a wearable device such as 182 in FIG. 1B. In certain cases, it is known that multipath effects result in multiple delayed copies of a signal being received at the voice-controlled device. Each of the electromagnetic signal and the acoustic signal may have different multipath properties. In these cases, if the location of reflecting objects within a constellation is known, it may be possible to detect changes in the delay for different copies of the signal. This may then allow tracking of the voice-controlled device (with a fixed speaker device) or the speaker device (with a fixed voice-controlled device) or of relative motion between the two. This may be performed in one to three dimensions.

The above examples may be implemented by a voice-controlled device where the audio pre-processor (e.g., 540 in FIGS. 5B and 5C) is configured to detect one or more versions of the second audio signal within the first audio signal, determine an acoustic transfer function that maps the second audio signal obtained from the electromagnetic signal to the detected one or more versions of the second audio signal, and use the determined acoustic transfer function to remove the one or more versions of the second audio signal from the first audio signal. The acoustic transfer function may include a linear or non-linear transformation that models the properties of the environment.

Thus, a voice-controlled device 510 may implement a method of processing an audio signal for a voice-controlled device. The method may include receiving, at a receiver of the voice-controlled device, a first electromagnetic signal from a remote device and extracting, using the receiver, a reference audio signal from the first electromagnetic signal. The remote device may be a speaker device 502 as described above. First identifying information is also extracted from the first electromagnetic signal. The first identifying information may include a carrier frequency of the first electromagnetic signal, an identifier from a network protocol used by the first electromagnetic signal, an identifier of the reference audio signal within the first electromagnetic signal, and/or any other identifying information related to the first electromagnetic signal and/or the reference audio signal.

The remote device may also generate a first set of sound waves from the reference audio signal. The voice-controlled device may use a microphone to convert the first set of sound waves into a source audio signal and then calculate one or more characteristics for the source audio signal using the reference audio signal. The one or more characteristics may include one or more time delays between the reference audio signal and versions of the reference audio signal contained in the source audio signal, one or more scaling factors for the versions of the reference audio signal contained in the source audio signal, an acoustic transfer function that maps the reference audio signal to the source audio signal, and/or other characteristics that may be used to generate at least one version of the reference audio signal contained in the source audio signal from the reference audio signal extracted from the first electromagnetic signal. The one or more characteristics may be calculated using a correlation function between the reference audio signal and source audio signal, one or more convolutional filters on the source audio signal, an acoustic transfer function calculation, or any other known calculation method.

The one or more characteristics may then be stored in association with the first identifying information for later use. The one or more characteristics may be stored in a database using the first identifying information as a tag, or as a tuple with the first identifying information in an array or a linked list, or as any other type of data structure that allows the one or more characteristics to be retrieved with the first identifying information. The one or more characteristics and first identifying information may be stored in any type of computer-readable medium, including non-volatile storage such as flash memory or a rotating magnetic media disc and/or volatile storage such as dynamic random access memory (DRAM).

At a time after the one or more characteristics were stored, the receiver of the voice-controlled device may receive a second electromagnetic signal from the remote device and extract a reference audio signal from the second electromagnetic signal. Second identifying information may be determined from the second electromagnetic signal and the one or more characteristics may be retrieved based on the second identifying information matching the first identifying information associated with the one or more characteristics. A second set of sound waves that include speech uttered by a user and other sound generated by the remote device may be received at the microphone of the voice-controlled device and converted into a first audio signal that includes a contribution from the speech uttered by the user and a contribution from the other sound. The first audio signal is then processed using the retrieved one or more characteristics in conjunction with the second audio signal to reduce the contribution from the other sound in a processed audio signal. The processed audio signal may then be sent for speech recognition to determine a voice command issued by the user.

Noise Capturing Device

Figure 6:
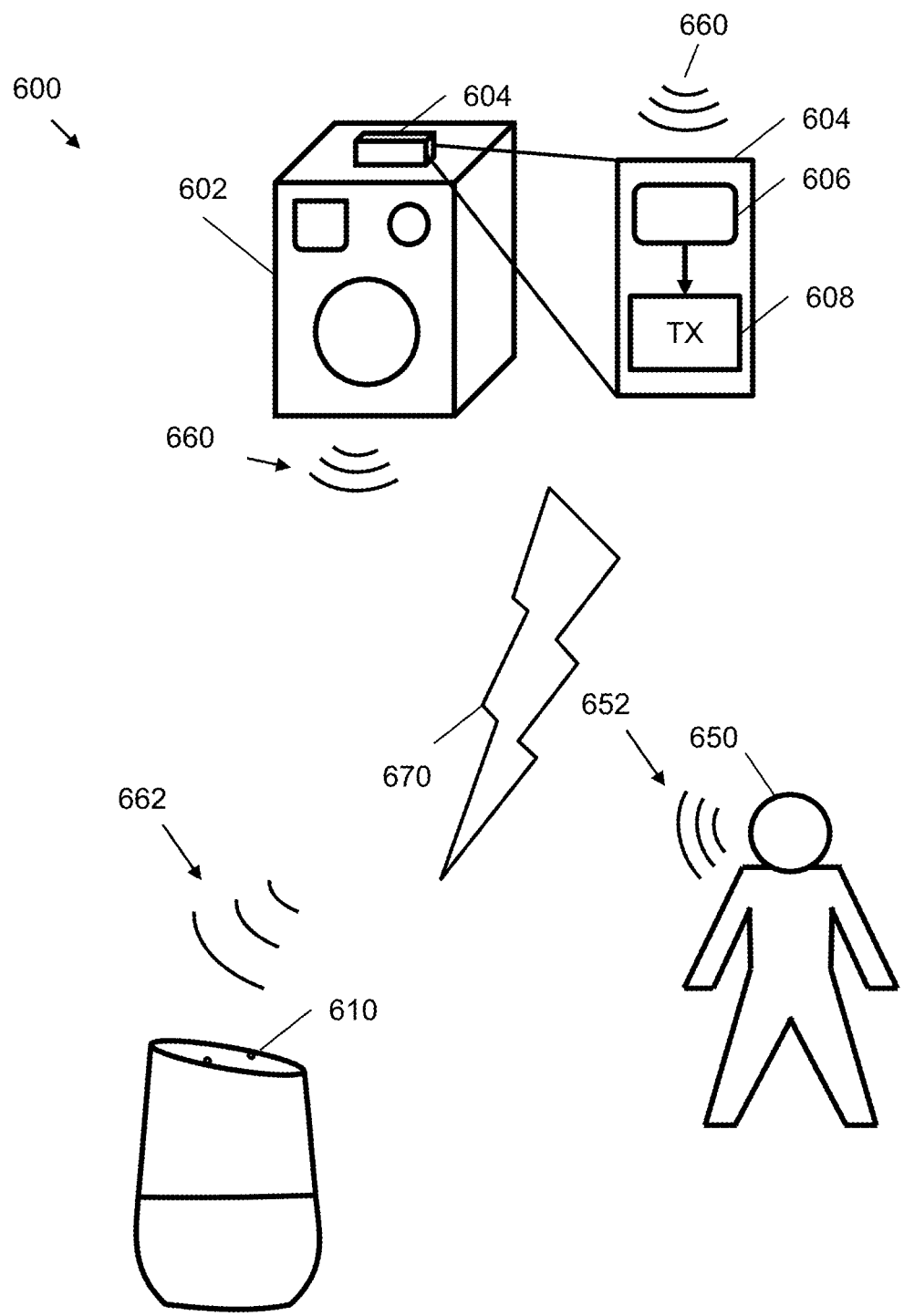
FIG. 6 is a schematic illustration showing an embodiment of a noise capture device.

FIG. 6 shows an example system 600 where the electromagnetic signal may be generated by an embodiment of a noise capturing device 604 that is located on, near, or within a source 602 of other sound 660, remote from a voice-controlled device 610, that may interfere with speech from a user received by the voice-controlled device 610. In this embodiment, the electromagnetic signal of previous examples is received from a remote device 604 and the second audio signal represents sounds that are captured by a transducer 606 at the remote device 604.

FIG. 6 shows an example source 602 in the form of a washing machine, but other non-limiting examples include coffee machines, freezers, refrigerators, industrial machinery, motors and generators, vehicle chassis, dishwashers, gym equipment, dog collars, nursery equipment, garden equipment, and the like. In FIG. 6, a noise capturing device 604 is attached (or positioned upon or near) the interfering noise source 602. The noise capturing device 604 may be a simple device comprising a transducer 606 and a transmitter 608. The transducer 606 is configured to convert locally generated sound waves or vibrations 660 into electrical signals that may then be transmitted by the transmitter 608 as the electromagnetic signal 670 of previous examples. The electromagnetic signal 670 may be received by a voice-controlled device 610 as per previous examples. The voice-controlled device 610 may also receive sound waves 662, including the noise 660 and the speech 652 of the user 650, using a microphone. The noise capturing device 604 may thus function in a similar manner to the loudspeaker example of FIG. 5A, but where an audio signal is captured from a local transducer of the noise capturing device 604 that is remote from a microphone of a voice-controlled device 610.

In use, a user 650 may wish to speak to the voice-controlled device 610 to issue a voice command. If the interfering noise source 602 is active, the sound waves 660 generated by the noise source 602 may superimpose with the sound waves 652 of the speech from the user 650 and are received at the voice-controlled device 610 as sound waves 662. However, in this case, the audio signal representative of the interfering noise source 602 is also captured locally by transducer 606 and transmitted in parallel by transmitter 608 to be received as the electromagnetic signal 670. The audio signal representative of the interfering noise source 602 thus forms the second audio signal of previous examples and may be removed from the first audio signal that is generated based on the sound waves 662.

The noise capturing device 604 may be a small, inexpensive, simple device. It may thus be added as a "dot" or "sticker" to noise sources to improve speech recognition within an environment. In one case, the noise capturing device 604 may include a small power source, such as a lithium cell battery and/or may harvest energy from the captured sound or vibrations to power the low power audio capture and transmission (e.g. similar to radio frequency identification technologies). In certain cases, the transducer 606 and the transmitter 608 may be different portions of a common micro-electro-mechanical system (MEMS) that may be applied as a standard component to known noise generating devices.

The attachment between the noise source 602 and noise capturing device 604, if directly connected, may be tight and rigid so that vibrational energy from the noise source 602 is transferred to noise capturing device 604 with approximately the same spectral frequency as the noise source 602 transfers to the ambient air. A large area of contact between the noise capturing device 604 and the housing or chassis of the noise source 602 may be helpful in this regard. A padded, flexible, or point connection may not allow of efficient transmission of audio-frequency vibrations from the source 602 to the transducer 606. A magnetic mount may be effective for noise sources 602 made from or housed in ferrous metals.

Alternatively, the noise capturing device 604 may be placed at a distance from the noise source 602 that is close but with air in between. The noise capturing device 604 may, accordingly, capture sound waves 660 moving through air directly. In such a configuration, it may be helpful for the noise capturing device 604 to have a minimally rigid coupling to the noise source 602 so that direct vibrations from the noise source 602 do not cancel or change the spectral frequency of noise 660 emitted by the noise source 602. This may be achieved, for example, by a noise capturing device 604 mounted pressed to a rubber surface atop a tripod with rubber feet near the noise source 602. Though inconvenient in a home environment, this can make voice control practical even in industrial work environments that are so loud that people must wear hearing protection devices.

Example Audio Processing Methods

Aspects of various embodiments are described with reference to flowchart illustrations and/or block diagrams of methods, apparatus, systems, and computer program products according to various embodiments disclosed herein. It will be understood that various blocks of the flowchart illustrations and/or block diagrams, and combinations of blocks in the flowchart illustrations and/or block diagrams, can be implemented by computer program instructions. These computer program instructions may be provided to a processor of a general-purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks. The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and/or block diagrams in the figures help to illustrate the architecture, functionality, and operation of possible implementations of systems, methods, and computer program products of various embodiments. In this regard, each block in the flowchart or block diagrams may represent a module, segment, or portion of code, which includes one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Figure 7:
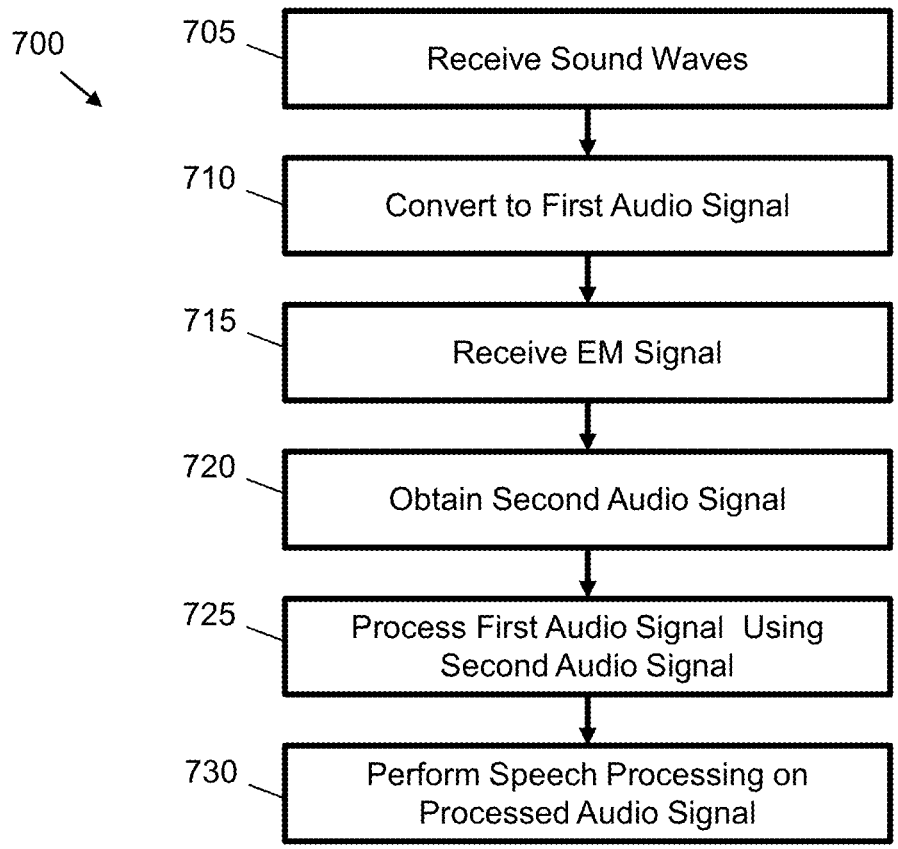
FIG. 7 is a flow diagram of an embodiment of a method of processing an audio data for a voice-controlled device.
Figure 8:
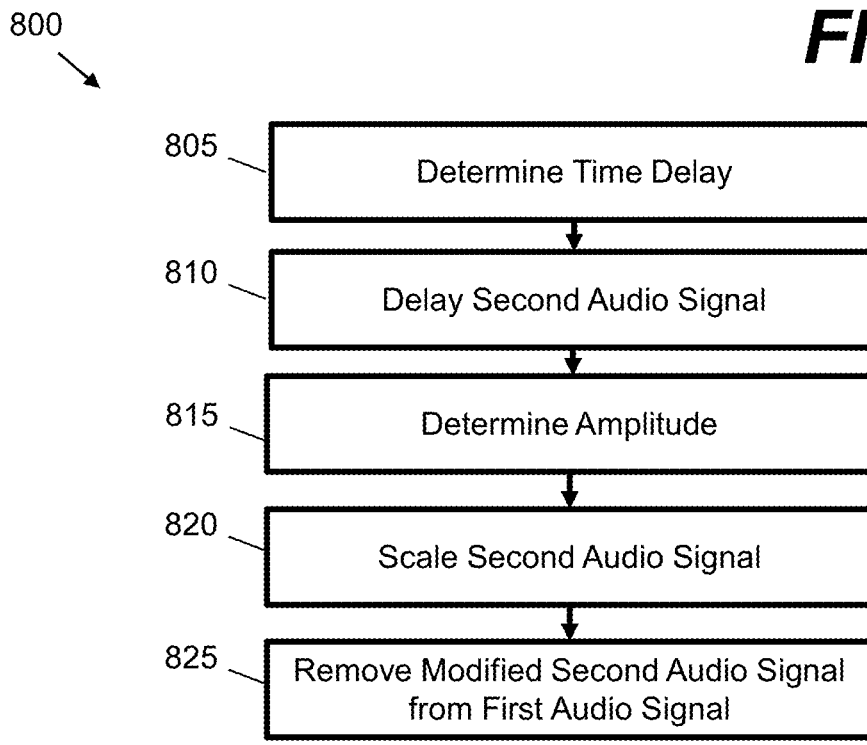
FIG. 8 is a flow diagram of an embodiment of a method of processing a second audio signal.

FIGS. 7 and 8 relate to embodiments of example audio processing methods. These methods may be applied using the systems of previous examples or using different components. In some embodiments, the methods may be applied by one or more processors, e.g. in the form of embedded processors or microcontrollers that process firmware computer program code.

FIG. 7 is a flow diagram of an embodiment of a method 700 of processing an audio signal for a voice-controlled device. The voice-controlled device may be any of the previously described voice-controlled devices or another voice-controlled device. The method 700 may be applied at and/or by the voice-controlled device. At block 705, the method includes receiving a set of sound waves at a microphone of the voice-controlled device, the set of sound waves comprising speech uttered by a user and other sound. The set of sound waves may originate from a user located at a distance from the voice-controlled device as shown in the examples of FIGS. 1A, 5C and 6 and from other sources. At block 710, the microphone converts the set of sound waves into a first audio signal that includes a contribution from the speech uttered by the user and a contribution from the other sound. At block 715, the method 700 includes receiving, at a receiver of the voice-controlled device, an electromagnetic signal. The receiver may include one of the receivers 130, 230, 330, or 430 of previous examples. The receiver may include a wireless receiver and the electromagnetic signal may include a wireless electromagnetic signal such as a radio transmission. At block 720, a second audio signal is obtained from the electromagnetic signal. This may include demodulating a carrier signal and/or decoding an encoded audio stream. At block 725, the first audio signal is processed using the second audio signal to reduce the contribution from the other sound in a processed audio signal. This may include selectively subtracting the second audio signal and/or data derived from the second audio signal from the first audio signal. The removal may occur locally at the voice-controlled device. At block 730, the method 700 includes performing speech recognition on the processed audio signal to determine a voice command issued by the user. This may include performing speech recognition locally at the voice-controlled device and/or communicating with a remote voice control server as shown in FIG. 2A.

FIG. 8 is a flow diagram of an embodiment of a method 800 of removing a second audio signal from a first audio signal according to one example. The method 800 may be used to implement block 725 in FIG. 7. The method 800 may be seen to correspond to the approach described with reference to FIG. 3.

At block 805, a time delay or difference is obtained. The time delay or difference is between a version of the second audio signal that is present within the first audio signal and the second audio signal that is obtained from the electromagnetic signal, e.g. the respective outputs of blocks 710 and 720. At block 810, the time delay or difference from block 805 is used to delay the second audio signal obtained from the electromagnetic signal, e.g. the signal from block 720.

At block 815, an amplitude is obtained. The amplitude is the amplitude of the version of the second audio signal that is present within the first audio signal. At block 820, the amplitude from block 810 is used to scale the time-delayed second audio signal.

Blocks 805 and 815 may be performed as part of a correlation and/or convolution function as described above. Some embodiments may implement both the path through block 805 and block 810 and the path through block 815 and block 820, while other embodiments may implement only one of those two paths. For embodiments that implement all four blocks 805-820, the result of block 820 is a time-delayed and amplitude-scaled version of the second audio signal. At block 825, this modified version of the second audio signal is used to reduce a contribution of the other sound from the first audio signal. This may be performed by subtracting the modified version of the second audio signal from the first audio signal as shown in FIG. 3.

As described with reference to FIG. 4, the electromagnetic signal may include at one or more electromagnetic signals. In such cases, the method 700 may further include: obtaining a plurality of other audio signals from the one or more electromagnetic signals, the plurality of other audio signals including the second audio signal (e.g. as shown in the output of the receiver 430 in FIG. 4); detecting one or more of the plurality of other audio signals within the first audio signal; and subtracting versions of the detected one or more of the plurality of other audio signals from the first audio signal as at least a part of said processing. In at least some cases, the one or more electromagnetic signals may include at least one modulated radio signal and the plurality of second other signals may be obtained by demodulating the at least one modulated radio signal.

In certain examples, the method 700 of FIG. 7 may include: determining that both a first version of the second audio signal and a second version of the second audio signal are present within the first audio signal, wherein the first version of the second audio signal and the second version of the second audio signal each have at least one of a different amplitude than, a delay from, or a frequency shift from, the second audio signal and from each other; and subtracting both the first version of the second audio signal and the second version of the second audio signal from the first audio signal as at least a part of said processing. For example, these operations may be performed in association with the examples of FIGS. 5B and 5C.

As shown in the example of FIG. 6, in certain cases the method 700 of FIG. 7 may include receiving at least some of the other sound at a transducer of a second device remote from the voice-controlled device; converting the other sound into the second audio signal; generating the electromagnetic signal using the second audio signal; and transmitting the electromagnetic signal from the second device for reception by the voice-controlled device. The at least some of the other sound may originate from an interfering audio source such as 602 in FIG. 6. The transducer may include the transducer 606 of FIG. 6. The method may also include encoding the second audio signal as an encoded audio stream; generating the electromagnetic signal using the encoded audio stream; and transmitting the electromagnetic signal for reception by the voice-controlled device. For example, these operations may be performed by the transducer 606 and/or the transmitter 608.

As described in the examples above, the electromagnetic signal may include a wireless radio signal. In certain cases, the electromagnetic signal may be transmitted through a wired network medium such as Ethernet cables and a router or through power lines within a building.

When implementing a profiling or setup method similar to that shown in FIG. 5B, the method may include a number of operations at a given speaker device within a set of speaker devices proximate to the voice-controlled device prior to receiving the set of sound waves at block 705. At a first operation, a test audio signal may be obtained, and a corresponding electromagnetic signal is generated that encodes the test audio signal. The latter generation may be performed by the transmitter 508 shown in FIG. 5A. The given speaker device is then driven using the test audio signal while in parallel (or prior to said driving) the electromagnetic signal that encodes the test audio signal is transmitted. In this case, the method 700 may include, as a pre-processing operation at the voice-controlled device, determining characteristics of at least one speaker device within the set of speaker devices based on the test audio signal as received by the voice-controlled device in the form of the set of sound waves and the electromagnetic signal. The determined characteristics may then be used at block 725 to remove at least one second audio signal originating from the set of speaker devices from the first audio signal. The determined characteristics may include the data 542A, 542B, 542C of FIGS. 5B and 5C.

In certain cases, the method 700 may include detecting one or more versions of the second audio signal within the first audio signal. This may be performed as part of a correlation function. The method may then include determining an acoustic transfer function that maps the second audio signal to the detected one or more versions of the second audio signal and using the determined acoustic transfer function to remove the one or more versions of the second audio signal from the first audio signal as at least a part of said processing of block 725. This may be implemented using a function similar to acoustic echo cancellation in some teleconferencing equipment. In some embodiments, the determined characteristics in the above example may include an acoustic transfer function that models how sound waves propagate from an interference source to the voice-controlled device. The acoustic transfer function may also be used to fingerprint or profile an environment surrounding a voice-controlled device.

Embodiments of method 700 may determine identifying information for the received electromagnetic signal that provided a second audio signal, such as a carrier frequency of the electromagnetic signal or an identifier from a network protocol such as an Internet Protocol (IP) address or a Media Access Control (MAC) address. The method may also then include retrieving one or more previously stored characteristics based on the identifying information and using the retrieved characteristics with the second audio signal as at least a part of said processing.

Speaker Device to Voice-Controlled Device Communication

Figure 9:
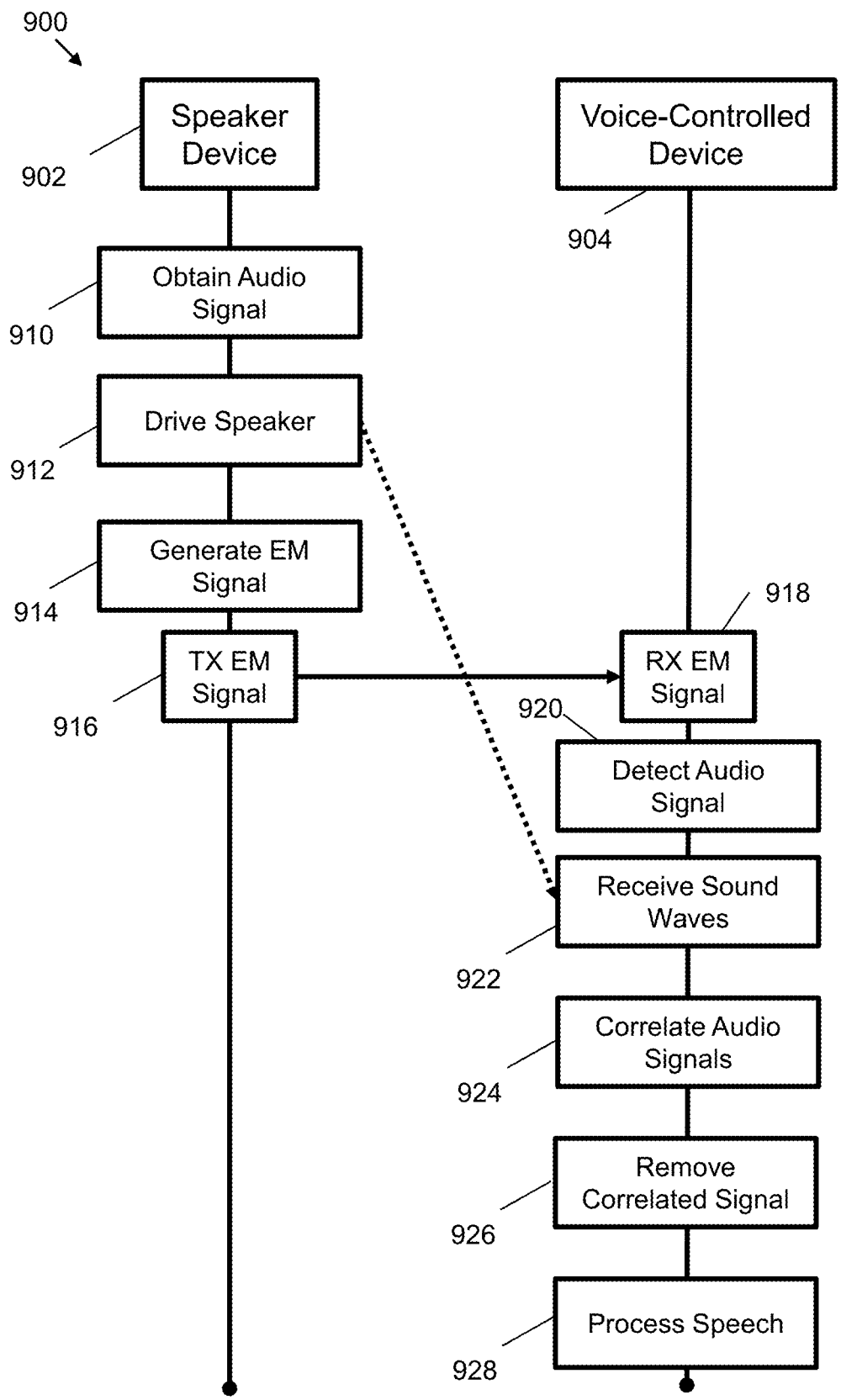
FIG. 9 is a diagram of information interchange of an embodiment of a speaker device and a voice-controlled device.

FIG. 9 is a sequence diagram 900 of information interchange of an embodiment of a speaker device 902 and a voice-controlled device 904. The diagram 900 may represent certain salient events that occur in the context of the examples of FIGS. 5A to 5C. It should be noted that the operations shown in the sequence diagram 900, as for the methods above, are not to be considered exclusive, for example, additional operations may be applied but have been omitted here for clarity of explanation. The operations of the sequence diagram 900 may be performed as part of any of the methods described above.

At block 910, the speaker device 902 obtains an audio signal. This may include the audio signal 504 shown in FIG. 5A. The audio signal may be obtained by any method including, but not limited to, receiving the audio signal through one or more conductors coupled to a connector of the speaker device 902 or by receiving a radio-frequency signal at the speaker device 902 and demodulating the radio-frequency signal to extract the audio signal. At block 912, the speaker device 902 uses the audio signal received at block 910 to drive at least one loudspeaker of the speaker device 902. This may be considered to be converting the audio signal into a set of sound waves emitted by the speaker device using an electroacoustic transducer. The set of sound waves may then travel through the air at the speed of sound to the voice controlled device 904.

At block 914, an electromagnetic signal that carries the audio signal is generated. This may include modulating a radio-frequency carrier with the audio signal from block 910 using analog amplitude modulation or digital amplitude shift keying to generate the electromagnetic signal or any other known analog or digital modulation scheme, such as, but not limited to, PM, FM, QAM, QPSK, or OFDM. The electromagnetic signal may include a radio-frequency carrier in an ISM band modulated with the audio signal and/or a radio-frequency carrier having a frequency of less than 300 MHz modulated with the audio signal. In some embodiments, the speaker device 902 may optionally convert the audio signal into a form that is better suited for transmission and noise removal before using the converted audio signal to generate the electromagnetic signal. In various embodiments this may include analog-to-digital conversion, compression, error encoding, and/or encryption. It may also include packaging data values for audio within a bitstream data structure. The converted audio signal may still be referred to as the audio signal as it still carries essentially the same sound information.

At block 916, the speaker device 902 transmits the electromagnetic signal for receipt by the voice-controlled device 904 that is also within audio range of the set of sound waves. In some embodiments where the audio signal is received through one or more conductors, the transmitting may be powered using the second audio signal by extracting electrical power from the audio signal and providing the extracted electrical power to the transmitter. The speaker device 902 may transmit the electromagnetic signal at a power level that results in a predefined attenuated signal level of the electromagnetic signal at the audibility range of the set of sound waves, wherein the audibility range of the set of sound waves corresponds to a distance at which the set of sound waves is estimated to be below a predetermined sound level (which may be between 20 dBA and 40 dBA). The predefined attenuated signal level of the electromagnetic signal may be based on a minimum signal level for reception of the electromagnetic signal by the voice-controlled device 904 configured to receive the electromagnetic signal. In some embodiments, the audibility range may be a predetermined fixed distance but in other embodiments the audibility range may be dynamically calculated based on an amplitude of the audio signal and/or a volume level set for the speaker device.

Turning now to the voice-controlled device 904 in FIG. 9, following receipt of the electromagnetic signal at block 918, a second audio signal (such as described in the examples above) is extracted from the electromagnetic signal at block 920. At block 922, a set of sound waves arrive at a microphone of the voice-controlled device 904 from the speaker device 902 and a first audio signal as described above is generated. Note that because of the difference in the speed of light and the speed of sound, the voice-controlled device 904 receives the electromagnetic signal before the sound waves even though the sound waves may have been generated by the speaker device 902 before the electromagnetic signal was sent. The set of sound waves may contain an utterance of a user in addition to the sound waves generated by the speaker device 902 at block 912. At block 924, the first and second audio signals are correlated. This may be performed, for example, as set out in FIG. 3 and may include a cross-correlation or auto-correlation function. At block 926, at least a version of the second audio signal is removed from the first audio signal based on the output of the correlation performed at block 924. In certain examples, the removing is selectively performed based on an output of the correlating. For example, the output of the correlating may indicate whether the second audio signal is present within the first audio signal (e.g., as compared to a defined threshold indicating presence), and the removing may only be performed if the signal is present. In other examples, the removing may be unconditional if the electromagnetic signal is received at block 918. At block 928, following removal of at least a version of the second audio signal (e.g., such as a modified version as described with reference to the method 800 of FIG. 8), the modified first audio signal is processed as part of a speech processing pipeline. As described above, this may include one or more of local and remote processing, and in many implementations involves communication across a network as shown in FIG. 2A.

Non-Transitory Computer-Readable Storage Medium

Figure 10:
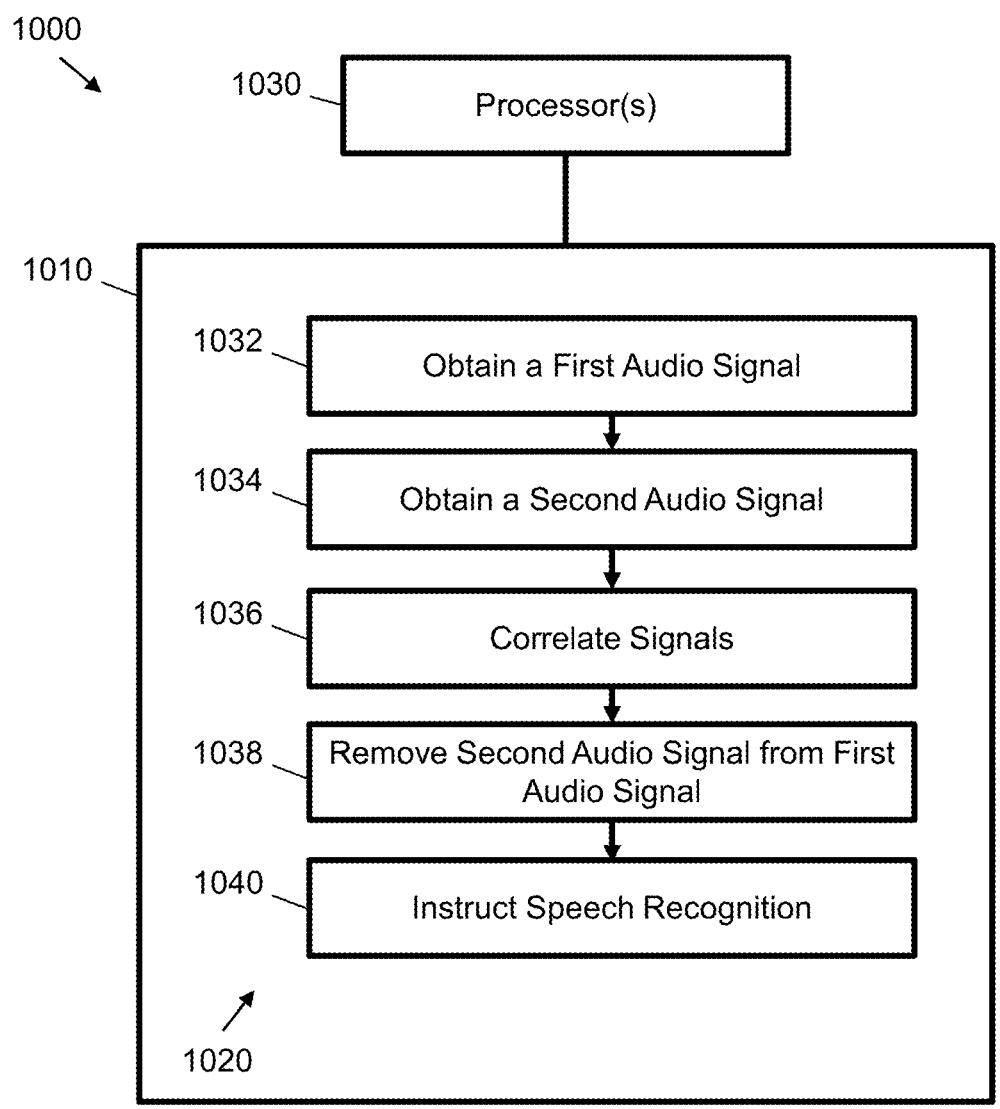
FIG. 10 is a schematic illustration showing an embodiment of a computer device adapted to process a set of instructions stored on a non-transitory computer-readable storage medium.

FIG. 10 shows an example computer system 1000 that includes at least one processor 1030 and a non-transitory computer-readable storage medium 1010 storing instructions 1020 which, when executed by at least one processor 1030, cause the at least one processor 1030 to perform a number of operations. This may be referred to as programming the processor using the instructions. The computer system 1000 may be a part of a voice-controlled device as described using various examples and embodiments herein. Via instructions 1032, the at least one processor 1030 is instructed to obtain a first audio signal. The first audio signal may include a contribution from speech uttered by a user and a contribution from other sound. The first audio signal may be derived from a set of sound waves that include the speech uttered by the user and the other sound received at a microphone of a voice-controlled device.

Via instructions 1034, the at least one processor 1030 is instructed to obtain a second audio signal. The second audio signal may be derived from an electromagnetic signal received at a receiver of the voice-controlled device (e.g., as described in the above examples). Via instructions 1036, the at least one processor 1030 is instructed to correlate the first audio signal and second audio signals to generate a set of correlation parameters. The correlation parameters may indicate a time delay and/or a scaling factor for the second audio signal such as shown in the example of FIG. 3. Via instructions 1038, the at least one processor 1030 is instructed to reduce the contribution from the other sound in the first audio signal using the set of correlation parameters to generate a processed audio signal. The correlation parameters may indicate a one or more time delays and/or scaling factors for the second audio signal due to a one or more versions of the second audio signal being found in the first audio signal as described with reference to one or more of FIG. 3 and FIG. 8. Via instructions 1040, the at least one processor 1030 is instructed to provide the processed audio signal to a speech recognition module to determine a voice command issued by the user. Speech recognition may be performed by the at least one processor 1030, e.g. implementing instructions to provide a speech processing pipeline, and/or performed in association with a remote voice control server as shown in FIG. 2A.

In some embodiments, the instructions 1020 may further program the processor 1030 to obtain a plurality of other audio signals, including the second audio signal, from the electromagnetic signal, the electromagnetic signal comprising one or more electromagnetic signals, detect one or more of the plurality of other audio signals within the first audio signal, and process the first audio signal using the detected one or more of the plurality of other audio signals to reduce the contribution from the other sound in the processed audio signal. The one or more electromagnetic signals may include at least one modulated radio signal and the plurality of other audio signals may be obtained by demodulating the at least one modulated radio signal.

In some embodiments, the instructions 1020 may further program the processor 1030 to obtain a third audio signal from the electromagnetic signal, the electromagnetic signal comprising one or more electromagnetic signals, correlate the first audio signal with the third audio signal to calculate a correlation value, and in response to the correlation value being larger than a threshold, further reduce the contribution from the other sound in the first audio signal by using the third audio signal to generate the processed audio signal.

Embodiments may include instructions 1020 that may program the processor 1030 to determine identifying information for the received electromagnetic signal and retrieve one or more previously stored characteristics based on the identifying information. The instructions 1020 may then program the processor 1030 to use the retrieved characteristics with the second audio signal as at least a part of said processing.

Alternatively, the instructions 1020 may include instructions to perform any of the methods described in the above examples. The non-transitory computer readable medium may include any known type of computer media, including, but not limited to, one or more of a rotating magnetic disk, a rotating optical disk, a flash random access memory (RAM) chip, dynamic RAM, and/or other mechanically moving or solid-state storage media.

Example Variations

Certain examples described herein present voice-controlled devices that have a transducer such as a microphone and a receiver. The microphone may include a MEMS microphone or a diaphragm microphone to captures an audio signal. An analog-to-digital converter (ADC) that operates at a frequency higher than an audible range or a range of speech may be used to digitize the received audio signal to create a stream of digital audio that is provided as a first audio signal. This first audio signal may then be compared with a second stream of digital audio (in the form of a second audio signal). The second stream of digital audio may be a "clean" copy of audio information that is also received by the microphone of the voice-controlled device. Digital encoding approaches for electromagnetic signals such as orthogonal frequency-division multiplexing, convolutional coding for forward error correction, and time/frequency interleaving enable demodulating and decoding clean radio-transmitted signal data with much less delay than sound propagation from even a very close loudspeaker to the microphone. This means that the signal derived from the electromagnetic signal may typically be of a higher quality (e.g., less corrupted) than a signal derived from a microphone. This makes it better for interfering noise removal, especially for sources that contain human speech.

Sound waves may also follow multiple paths from transmitter to receiver. Typically, the first to arrive has taken the most direct path and therefore has suffered the least attenuation. It may therefore also be the loudest. In this case, there may be multiple copies of an interfering audio stream that are present in an audio recording at a microphone. While comparative filtering and noise removal approaches may remove a loudest first signal, it may be difficult to remove the versions of the signal that arrive via other paths, such as echoes from objects and surfaces within the environment. In the present examples, multiple versions of the second audio signal may be detected, e.g. the correlation in FIG. 3 may output multiple sets of time delay and scaling factor parameters indicating multiple versions of the second audio signal that are present (e.g., due to different paths). It may be easier to remove modified versions of a clean audio signal than trying to determine the waveform of the interfering signal (e.g., with the complex mixture of echoes) and then removing that waveform. Similar approaches may also be applied to multi-channel speaker systems, allowing a common device setup to manage different interfering noise sources. For example, the approaches described in examples herein may be applied linearly, e.g. noise from a radio may be removed as per FIG. 4, noise from a surround sound system may be removed as per FIG. 5C and noise from a washing machine may be removed as per FIG. 6.

In examples described herein, detection of one or more receptions of a second audio signal may be performed with known correlation methods such as off-the-shelf cross-correlation and auto-correlation methods. In a static environment, detection may only be performed occasionally, and amplitude calculation of each of the multiple paths of reception may be averaged over multiple samples to improve accuracy (e.g., the estimates for s and t in FIG. 3 may be averaged for multiple correlations between segments of the second audio signal and the first audio signal). In a dynamic environment, correlation functions may be performed periodically or occasionally to update parameter estimates and/or continuously to detect reception of the signal from one or more paths and the present amplitude of the signal. After a correlation function has been used to detect one or more receptions and their delays and amplitudes, the voice-controlled device may be able to take one or more time-delayed copies of audio encoded in one or more received radio signals, scale the signal copies by the computed amplitude corresponding to the delay, and subtract the scaled time-delayed signal samples from the audio captured and sampled by the voice-controlled device.

In certain examples, a microphone device for use with a voice-controlled device may be provided that includes a radio receiver enabled to receive a radio signal comprising a sound information signal (e.g., the second audio signal), a microphone configured to receive an air pressure (i.e. sound) wave comprising the sound information and produce a corresponding electrical signal (e.g., the first audio signal), a correlator to compute an amplitude of the audio information signal within the electrical signal, and a subtractor to subtract the audio information signal from the electrical signal. In addition, the microphone device for use with a voice-controlled device may be wearable, such as a headset, and may utilize many of the elements disclosed herein. For example microphone device may include a microphone configured to receive a set of sound waves comprising speech uttered by a user and other sound, and to output a first audio signal that includes a contribution from the speech uttered by the user and a contribution from the other sound, a receiver configured to receive an electromagnetic signal and to output a second audio signal obtained from the electromagnetic signal, and an audio pre-processor configured to process the first audio signal using the second audio signal to reduce the contribution from the other sound in a processed audio signal. The microphone device may then provide the processed audio signal to a speech recognition module to determine a voice command issued by the user.

In certain examples, there may also, or alternatively, be a loudspeaker device comprising: an input for receiving an electrical signal comprising sound information in the range of audible frequencies (e.g., the second audio signal); a loudspeaker, coupled to the input, the loudspeaker configured to output an air pressure (i.e. sound) wave corresponding to the electrical signal; and a radio transmitter, coupled to the input, where the transmitter is configured to output a radio signal corresponding to the electrical signal. In this case, a power level of the radio signal may be configured such that the radio signal provides no discernable signal above noise at a defined line of sight range through air.

In certain examples, the speed of electromagnetic transmission may be exploited to buffer portions of the second audio signal in advance of receiving sound waves generated using said signal (e.g. via a playing radio or the example of FIG. 5A). In this case, the "early" availability of the second audio signal may facilitate real-time audio processing, e.g. as compared to comparative solutions that seek to derive the second audio signal from the first audio signal alone.

Although certain examples use an electromagnetic signal, in other examples other forms of transmission may alternatively be used. For example, digital signals may be transmitted via ultrasound (frequencies greater than the range of human hearing), where much more information, including digital information, may be communicated using this approach as opposed to relying on the transmission via audible sound waves that are mixed with other sound sources. In certain examples, the electromagnetic signal may include a modulated power line signal, e.g. whereby an available current and/or voltage within a buildings electrical power system is modulated to carry the second audio signal. This implementation may be beneficial for non-wireless speaker devices that are powered via a plug. In many cases, a voice-controlled device will use a plug to power the device, and in these cases the electromagnetic signal may be received via the power lines as per wired connection 580 in FIG. 5A.

Certain examples described herein may be implemented as a complimentary ecosystem of speaker devices and voice-controlled devices. Each device may operate independently but may be capable of operating in group settings such as those shown in FIGS. 5B and 5C. In certain cases, a specification for the electromagnetic signals may be developed, whereby devices apply this specification to implement the described approaches. The form of the electromagnetic signals may thus form a standardized personal area network (PAN) radio communication protocol. In certain implementations, the communications may be unencrypted and so not require pairing, e.g. they may simply work with limited range within a building.

In other examples, similar approaches to the examples above may be used for wearable devices with a microphone that is in proximity to a user's mouth, e.g. within 5-50 cm. In this case, the wearable device may resemble the noise capturing device 604 of FIG. 6, but the second audio signal may be added to the first audio signal instead of being removed. For example, the wearable device may attach to a user's (upper) body or include a headset or ear loop. The wearable device in this case may receive the wearer's speech and transmit it via an electromagnetic signal as described herein. The speech-transmitted signal can then be added, rather than subtracted, from the audio captured by the microphone to improve accuracy of speech recognition.

In other examples, similar approaches to the examples above may be used for sound capturing devices other than voice-controlled devices. In general, technologies as described herein can be used to subtract sounds to be rejected from ambient sound by use of one or more electromagnetic signals carrying information indicative of the sound emitted by one or more sources to be rejected.

Active noise cancelling headphones are notorious for cancelling only relatively low frequencies such as frequencies below 500 Hz. This may be due to the unavoidable delay in sending and processing a signal indicating detected ambient noise to the counteracting loudspeakers inside the headphones. In another example of the present technology, active noise cancelling headphones may receive one or more electromagnetic signals carrying information indicative of sounds emitted from one or more noise sources in the ambient environment. Because the electromagnetic signal arrives at the noise cancelling headphones long before the sound of the corresponding noise, the active noise cancelling headphones may be able to drive the counteracting loudspeakers inside the headphones with less delay and thereby more effectively cancel higher frequency noises.

In other examples, a speaker device with a loudspeaker driven by an amplifier with equalization control may emit sound waves and a corresponding electromagnetic signal carrying information representing the sound as emitted by the speaker device. A receiving device may receive the sound waves and the electromagnetic signal. The receiving device may perform rejection of other ambient noise or assume that the sound received has insignificant added noise. The receiving device may then perform a comparison of the sound that it receives to the information encoded in the electromagnetic signal. By computing differences, the receiving device may thereby determine the effects of the space on the sound and/or compute a transfer function of the loudspeaker. The receiving device may indicate the difference to a user and/or send a signal or command to the speaker device to adjust its equalization settings to compensate for the distortion of the signal.

A notorious problem for people giving speeches or other performs on a stage with one or more large speakers to project the sound of the performer's voice from a microphone is that if the microphone is too close to a speaker, a positive feedback loop is created in which the sound from the speaker is captured by the microphone and converted to an electronic signal back to the speaker, which amplifies it and converts it to sound again at a louder volume. The result is a growing loud squeal or hum that is especially annoying to listeners. Another application of the present technology is for an appropriately designed loudspeaker to transmit an electromagnetic signal corresponding to the sound that it projects. An appropriately designed microphone can receive the electromagnetic signal. The microphone can subtract the electromagnetic signal from the audio signal received from the speaker to remove it wherein doing so reduces the amplitude of the sound from the speaker at the microphone, cancelling or reducing the positive feedback loop. A microphone without the signal processing capability to perform the signal cancellation may simply transmit or encode the captured electromagnetic signal with the electromagnetic signal corresponding to its captured sound. An amplifier or loudspeaker may receive the encoded signal and perform the necessary subtraction. With such an approach, the amplifier or loudspeaker may adjust the amplitude indicated by the electromagnetic signal that it emits to subtract its sound signal at a near perfect amplitude to effectively eliminate any artifact of positive feedback. Such an application of the present technology allows a performer to bring a microphone very close to a loudspeaker device without causing any annoying squeal or hum sounds.

As will be appreciated by those of ordinary skill in the art, aspects of the various embodiments may be embodied as a system, device, method, or computer program product apparatus. Accordingly, elements of the present disclosure may take the form of an entirely hardware embodiment, an entirely software embodiment (including firmware, resident software, micro-code, or the like) or an embodiment combining software and hardware aspects that may all generally be referred to herein as a "server," "circuit," "module," "client," "computer," "logic," or "system," or other terms. Furthermore, aspects of the various embodiments may take the form of a computer program product embodied in one or more computer-readable medium(s) having computer program code stored thereon.

Any combination of one or more computer-readable storage medium(s) may be utilized. A computer-readable storage medium may be embodied as, for example, an electronic, magnetic, optical, electromagnetic, infrared, or semiconductor system, apparatus, or device, or other like storage devices known to those of ordinary skill in the art, or any suitable combination of computer-readable storage mediums described herein. In the context of this document, a computer-readable storage medium may be any tangible medium that can contain, or store, a program and/or data for use by or in connection with an instruction execution system, apparatus, or device. Even if the data in the computer-readable storage medium requires action to maintain the storage of data, such as in a traditional semiconductor-based dynamic random access memory, the data storage in a computer-readable storage medium can be considered to be non-transitory. A computer data transmission medium, such as a transmission line, a coaxial cable, a radio-frequency carrier, and the like, may also be able to store data, although any data storage in a data transmission medium can be said to be transitory storage. Nonetheless, a computer-readable storage medium, as the term is used herein, does not include a computer data transmission medium, or transitory storage.

Computer program code for carrying out operations for aspects of various embodiments may be written in any combination of one or more programming languages, including object oriented programming languages such as Java, Python, C++, or the like, conventional procedural programming languages, such as the "C" programming language or similar programming languages, or low-level computer languages, such as assembly language or microcode. The computer program code if loaded onto a computer, or other programmable apparatus, produces a computer implemented method. The instructions which execute on the computer or other programmable apparatus may provide the mechanism for implementing some or all of the functions/acts specified in the flowchart and/or block diagram block or blocks. In accordance with various implementations, the program code may execute entirely on the user's computer, partly on the user's computer, as a standalone software package, partly on the user's computer and partly on a remote computer or entirely on the remote computer or server, such as a cloud-based server. In the latter scenario, the remote computer may be connected to the user's computer through any type of network, including a local area network (LAN) or a wide area network (WAN), or the connection may be made to an external computer (for example, through the Internet using an Internet Service Provider). The computer program code stored in/on (i.e. embodied therewith) the non-transitory computer-readable medium produces an article of manufacture.

The computer program code, if executed by a processor causes physical changes in the electronic devices of the processor which change the physical flow of electrons through the devices. This alters the connections between devices, which changes the functionality of the circuit. For example, if two transistors in a processor are wired to perform a multiplexing operation under control of the computer program code, if a first computer instruction is executed, electrons from a first source flow through the first transistor to a destination, but if a different computer instruction is executed, electrons from the first source are blocked from reaching the destination, but electrons from a second source are allowed to flow through the second transistor to the destination. So a processor programmed to perform a task is transformed from what the processor was before being programmed to perform that task, much like a physical plumbing system with different valves can be controlled to change the physical flow of a fluid.

Unless otherwise indicated, all numbers expressing quantities, properties, measurements, and so forth, used in the specification and claims are to be understood as being modified in all instances by the term "about." The recitation of numerical ranges by endpoints includes all numbers subsumed within that range, including the endpoints (e.g. 1 to 5 includes 1, 2.78, π, 3.33, 4, and 5).

As used in this specification and the appended claims, the singular forms "a", "an", and "the" include plural referents unless the content clearly dictates otherwise. Furthermore, as used in this specification and the appended claims, the term "or" is generally employed in its sense including "and/or" unless the content clearly dictates otherwise. As used herein, the term "coupled" includes direct and indirect connections. Moreover, where first and second devices are coupled, intervening devices including active devices may be located there between.

The description of the various embodiments provided above is illustrative in nature and is not intended to limit this disclosure, its application, or uses. Thus, different variations beyond those described herein are intended to be within the scope of embodiments. Such variations are not to be regarded as a departure from the intended scope of this disclosure. As such, the breadth and scope of the present disclosure should not be limited by the above-described example embodiments but should be defined only in accordance with the following claims and equivalents thereof.

What is claimed is:

1. A method of processing an audio signal, the method comprising:
   receiving a set of sound waves at a microphone of a device, the set of sound waves comprising a sound of interest and other sound;
   converting, using the microphone, the set of sound waves into a first audio signal that includes a contribution from the sound of interest and a contribution from the other sound;
   receiving, at a receiver of the device, an electromagnetic signal carrying a second audio signal;
   extracting the second audio signal from the electromagnetic signal;
   correlating the first audio signal with the second audio signal to calculate a correlation value;
   in response to the correlation value being larger than a threshold, processing the first audio signal using the second audio signal to reduce the contribution from the other sound in a processed audio signal; and
   performing further processing on the processed audio signal to determine a characteristic of the sound of interest.

2. The method of claim 1, further comprising:
   determining an amplitude of a version of the second audio signal that is present within the first audio signal;
   scaling the second audio signal obtained from the electromagnetic signal based on the determined amplitude to generate a modified version of the second audio signal; and
   subtracting the modified version of the second audio signal from the first audio signal as at least a part of said processing.

3. The method of claim 1, further comprising:
determining a time difference between a version of the second audio signal that is present within the first audio signal and the second audio signal that is obtained from the electromagnetic signal;
delaying the second audio signal obtained from the electromagnetic signal using the determined time difference to generate a modified version of the second audio signal; and
subtracting the modified version of the second audio signal from the first audio signal as at least a part of said processing.

4. The method of claim 1, wherein the electromagnetic signal comprises a modulated radio signal and the second audio signal is extracted by demodulating the modulated radio signal.

5. The method of claim 1, further comprising:
generating, at a speaker device, the electromagnetic signal by modulating a radio signal using the second audio signal;
transmitting, from the speaker device to the device, the electromagnetic signal; and
producing, by the speaker device, at least some of the other sound using the second audio signal.

6. The method of claim 5, further comprising:
receiving, at the speaker device, an electrical signal through one or more conductors, the electrical signal comprising the second audio signal; and
powering a transmitter for the electromagnetic signal in the speaker device using electrical power extracted from the second audio signal in the electrical signal.

7. The method of claim 1, wherein the electromagnetic signal comprises a radio-frequency carrier modulated using the second audio signal.

8. The method of claim 1, further comprising:
determining that both a first version of the second audio signal and a second version of the second audio signal are present within the first audio signal, wherein the first version of the second audio signal and the second version of the second audio signal each have at least one of a different amplitude than, a delay from, or a frequency shift from, the second audio signal and from each other; and
subtracting both the first version of the second audio signal and the second version of the second audio signal from the first audio signal as at least a part of said processing.

9. The method of claim 1, further comprising:
receiving at least some of the other sound at a transducer of a second device remote from the device;
converting the received at least some of the other sound into the second audio signal;
generating the electromagnetic signal using the second audio signal; and
transmitting the electromagnetic signal from the second device for reception by the device.

10. The method of claim 1, further comprising:
detecting one or more versions of the second audio signal within the first audio signal;
determining an acoustic transfer function that maps the second audio signal to the detected one or more versions of the second audio signal; and
using the determined acoustic transfer function to remove the one or more versions of the second audio signal from the first audio signal as at least a part of said processing.

11. A device comprising:
a microphone to receive a set of sound waves comprising sound of interest and other sound, and to output a first audio signal that includes a contribution from the sound of interest and a contribution from the other sound;
a receiver to receive an electromagnetic signal and to output a second audio signal obtained from the electromagnetic signal;
a correlator to generate one or more correlation parameters from a correlation of the first audio signal and the second audio signal; and
an audio pre-processor to process the first audio signal using the second audio signal and at least one of the one or more correlation parameters to reduce the contribution from the other sound in a processed audio signal;
wherein the device is configured to provide the processed audio signal to at least one processor to determine a characteristic of the sound of interest.

12. The device of claim 11, wherein the one or more correlation parameters comprise a time delay and/or a scaling factor.

13. The device of claim 11, wherein the device is configured to determine signal characteristics for a plurality of copies of the second audio signal that are present within the first audio signal and wherein the audio pre-processor is further configured to process the first audio signal based on the signal characteristics to generate the processed audio signal.

14. The device of claim 11, wherein the electromagnetic signal is received from a remote device and the second audio signal represents sounds that are captured by a transducer at the remote device.

15. The device of claim 11, wherein the audio pre-processor is further configured to:
detect one or more versions of the second audio signal within the first audio signal;
determine an acoustic transfer function that maps the second audio signal to the detected one or more versions of the second audio signal; and
use the determined acoustic transfer function to remove the one or more versions of the second audio signal from the first audio signal to generate the processed audio signal.

16. A non-transitory computer-readable storage medium storing instructions which, when executed by at least one processor, program the at least one processor to:
obtain a first audio signal that includes a contribution from sound of interest and a contribution from other sound, the first audio signal derived from a set of sound waves received at a microphone of a device, the set of sound waves comprising the sound of interest and the other sound;
obtain a second audio signal, the second audio signal derived from an electromagnetic signal received at a receiver of the device;
correlate the first audio signal and the second audio signal to generate one or more correlation parameters, the one or more correlation parameters indicating a time delay and/or a scaling factor for the second audio signal;
in response to the scaling factor being larger than a threshold, reduce the contribution from the other sound in the first audio signal using the second audio signal and the one or more correlation parameters to generate a processed audio signal; and
provide the processed audio signal to an audio processor to determine a characteristic of the sound of interest.

17. The storage medium of claim 16, the at least one processor further programmed to:

obtain a plurality of other audio signals, including the second audio signal, from the electromagnetic signal, the electromagnetic signal comprising one or more electromagnetic signals;

detect one or more of the plurality of other audio signals within the first audio signal; and process the first audio signal using the detected one or more of the plurality of other audio signals to reduce the contribution from the other sound in the processed audio signal.

18. The storage medium of claim 16, the at least one processor further programmed to:

obtain a third audio signal from the electromagnetic signal, the electromagnetic signal comprising one or more electromagnetic signals;

correlate the first audio signal with the third audio signal to calculate a correlation value; and in response to the correlation value being larger than a threshold, further reduce the contribution from the other sound in the first audio signal by using the third audio signal to generate the processed audio signal.

19. The storage medium of claim 16, wherein the one or more correlation parameters indicate a plurality of time delays and/or scaling factors for the second audio signal due to a plurality of versions of the second audio signal being found in the first audio signal.

20. The storage medium of claim 16, the at least one processor further programmed to:

determine identifying information for the received electromagnetic signal;

retrieve one or more previously stored characteristics based on the identifying information; and use the retrieved characteristics with the second audio signal as at least a part of said processing.

* * * * *